US008659870B2

(12) United States Patent
Brendel et al.

(10) Patent No.: US 8,659,870 B2
(45) Date of Patent: Feb. 25, 2014

(54) MODULAR EMI FILTERED TERMINAL ASSEMBLY FOR AN ACTIVE IMPLANTABLE MEDICAL DEVICE

(75) Inventors: Richard L. Brendel, Carson City, NV (US); Robert A. Stevenson, Canyon Country, CA (US); Thomas Marzano, East Amherst, NY (US); Jason Woods, Carson City, NV (US); Scott W. Kelley, Canyon Country, CA (US)

(73) Assignee: Greatbatch Ltd., Clarence, NY (US)

( * ) Notice: Subject to any disclaimer, the term of this patent is extended or adjusted under 35 U.S.C. 154(b) by 294 days.

(21) Appl. No.: 12/951,559

(22) Filed: Nov. 22, 2010

(65) Prior Publication Data
US 2012/0127627 A1 May 24, 2012

(51) Int. Cl.
*H01G 4/35* (2006.01)
(52) U.S. Cl.
USPC ........ 361/302; 361/307; 361/306.3; 361/309; 361/321.6; 361/519
(58) Field of Classification Search
USPC ........... 361/302, 303, 306.1, 307, 306.3, 309, 361/321.6, 519, 535; 333/182
See application file for complete search history.

(56) References Cited

U.S. PATENT DOCUMENTS

| 4,424,551 | A | 1/1984 | Stevenson et al. |
| 5,015,993 | A * | 5/1991 | Strom-Olsen et al. ........ 340/551 |
| 5,333,095 | A * | 7/1994 | Stevenson et al. ............ 361/302 |
| 6,275,369 | B1 | 8/2001 | Stevenson et al. |
| 6,529,103 | B1 | 3/2003 | Brendel et al. |
| 6,566,978 | B2 * | 5/2003 | Stevenson et al. ............ 333/182 |
| 6,643,903 | B2 | 11/2003 | Haskell et al. |
| 6,765,779 | B2 | 7/2004 | Stevenson et al. |
| 7,489,495 | B2 * | 2/2009 | Stevenson ..................... 361/302 |

* cited by examiner

*Primary Examiner* — Robert J Hoffberg
*Assistant Examiner* — Hung Dang
(74) *Attorney, Agent, or Firm* — Michael F. Scalise

(57) ABSTRACT

A modular EMI filtered terminal assembly for an active implantable medical device (AIMD) includes a hermetic terminal subassembly having at least one conductor extending through an insulator in non-conductive relation with the AIMD housing, and a feedthrough capacitor subassembly disposed generally adjacent to the hermetic terminal assembly. The feedthrough capacitor subassembly includes a conductive modular cup conductively coupled to the AIMD housing, and a feedthrough capacitor disposed within the modular cup. A first electrode plate or set of electrode plates is conductively coupled to the conductor, and a second electrode plate or set of electrode plates is conductively coupled to the modular cup.

53 Claims, 16 Drawing Sheets

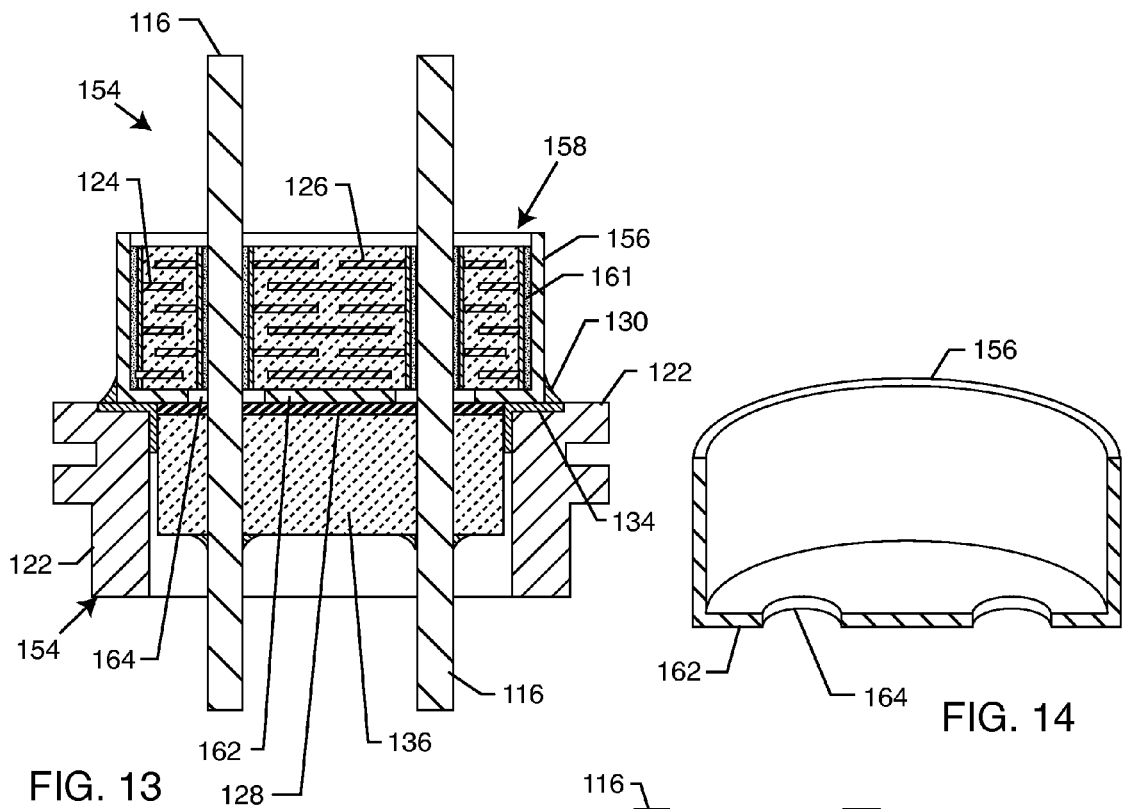
FIG. 13
FIG. 14
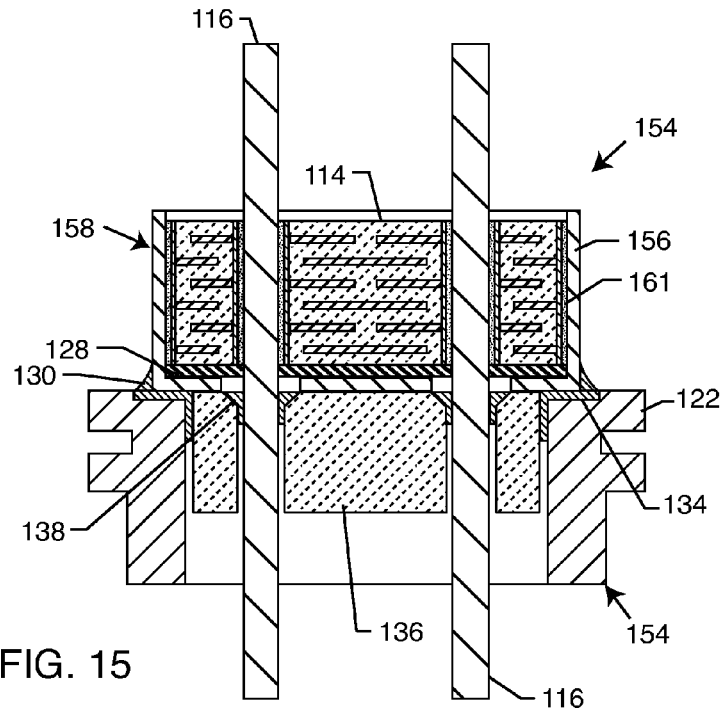
FIG. 15

MODULAR EMI FILTERED TERMINAL ASSEMBLY FOR AN ACTIVE IMPLANTABLE MEDICAL DEVICE

FIELD OF INVENTION

This invention relates generally to feedthrough capacitor terminal pin subassemblies and related methods of construction, particularly of the type used in implantable medical devices such as cardiac pacemakers and the like, to decouple and shield undesirable electromagnetic interference (EMI) signals from the device. More specifically, this invention relates to a method of providing a feedthrough capacitor subassembly disposed generally adjacent to the hermetic terminal subassembly of an active implantable medical device (AIMD), where the feedthrough capacitor subassembly includes a conductive modular cup conductively coupled to either the ferrule of the hermetic seal of the hermetic terminal subassembly, or the AIMD housing. A feedthrough capacitor is disposed within the modular cup such that a first electrode plate or set of electrode plates is conductively coupled to at least one feedthrough conductor or leadwire, and a second electrode plate or set of electrode plates, known as the ground electrode plates, is conductively coupled to the modular cup. This invention is particularly designed for use in cardiac pacemakers (bradycardia devices), cardioverter defibrillators (tachycardia), neuro-stimulators, internal drug pumps, cochlear implants and other devices used in medical implant applications.

BACKGROUND OF THE INVENTION

Feedthrough terminal pin assemblies are generally well known in the art for connecting electrical signals through the housing or case of an electronic device. For example, in implantable medical devices such as cardiac pacemakers, defibrillators or the like, the terminal pin assembly comprises one or more conductive terminal pins supported by an insulator structure for feedthrough passage from the exterior to the interior of the medical device. Many different insulator structures and related mounting methods are known in the art for use in medical devices wherein the insulator structure provides a hermetic seal to prevent entry of body fluids into the housing of the medical device. However, the feedthrough terminal pins or leadwires are typically connected to one or more implanted leads which effectively act as an antenna and thus tend to collect stray EMI signals for transmission into the interior of the medical device. In prior art devices, the hermetic terminal pin subassembly has been combined in various ways with a ceramic feedthrough filter capacitor to decouple interference signals to the housing of the medical device.

In a typical prior art unipolar or multipolar construction (as described in U.S. Pat. No. 5,333,095), a round/discoidal (or rectangular) ceramic feedthrough filter capacitor is combined with a hermetic terminal pin assembly to suppress and decouple undesired interference or noise transmission along a terminal pin.

Prior art feedthrough filter capacitors work very well as EMI filters, however, they tend to be very expensive. One problem is the difficulty of mounting the feedthrough capacitor to a hermetic terminal. The dielectric body of the feedthrough capacitor is generally of a high dielectric constant (k) barium titinate or equivalent ceramic dielectric. High k dielectrics tend to be structurally very weak. When mounted to the ferrule of the hermetic terminal or the housing of an AIMD, there is a substantial mismatch in the coefficient of expansion of the surrounding materials. Hermetic terminal ferrules or housings, in the prior art, are generally of either titanium alloys or stainless steel. The ferrule of the hermetic terminal is generally laser welded into the overall housing of an active implantable medical device (AIMD). This creates a substantial thermal shock which the ceramic capacitor must withstand, in addition, there is a difference in the thermal coefficient of expansion of the capacitor compared to the titanium or stainless steel. This causes significant mechanical stresses to be applied to the ceramic capacitor. Accordingly, its mounting means must be stress absorbing, such as a thermal-setting conductive polyimide. In the prior art, thermal-setting conductive polyimides and epoxies have been very difficult to control. Attempts to automate this process by pick-and-place and dispensing robots has been confounded by the small geometries and tolerances involved.

Accordingly, what is needed is an EMI filtered terminal assembly that facilitates low cost automated attachment of a feedthrough capacitor to a hermetic terminal subassembly in such a way that it will provide effective EMI filtering for an AIMD.

SUMMARY OF THE INVENTION

The present invention resides in a modular EMI filtered terminal assembly for an active implantable medical device (AIMD). The modular EMI filtered terminal assembly comprises a hermetic terminal subassembly including at least one conductor or leadwire extending through an insulator in non-conductive relation with an AIMD housing, and a feedthrough capacitor subassembly disposed generally adjacent to the hermetic terminal subassembly. The feedthrough capacitor subassembly includes a conductive modular cup conductively coupled to the AIMD housing, and a feedthrough capacitor disposed within the modular cup. A first electrode plate or set of electrode plates is conductively coupled to the at least one conductor or leadwire, and a second electrode plate or set of electrode plates is conductively coupled to the modular cup.

The hermetic terminal subassembly may include a conductive ferrule conductively coupled to the AIMD housing. In such case, the modular cup is conductively coupled to the ferrule.

The feedthrough capacitor may include surface metallization on an outer peripheral surface thereof, which is conductively coupled to the second electrode plate or set of electrode plates (ground plates). The surface metallization is then conductively coupled to the modular cup.

The modular cup typically includes a wall at least partially surrounding the outer peripheral surface of the feedthrough capacitor, and a webplate. The modular cup wall may include at least one aperture facilitating the conductive attachment between the feedthrough capacitor surface metallization and the modular cup. The webplate may comprise a partial webplate, a full webplate or a web flange. The facing surfaces of the webplate and the hermetic terminal subassembly may define a leak detection gap.

An electrically insulative washer is typically disposed between the feedthrough capacitor and the hermetic terminal subassembly. The insulative washer may be disposed between the hermetic terminal subassembly and the modular cup, or alternatively between the feedthrough capacitor and the modular cup, or both.

The feedthrough capacitor may be internally grounded to the modular cup. In that case, the modular cup includes a conductive ground pin extending into the feedthrough capacitor and conductively coupled to the second electrode plate or set of electrode plates. Even when utilizing an internally grounded capacitor, the surface metallization may be provided on at least one outer surface of the feedthrough capacitor which is conductively coupled to the second electrode plate or set of electrode plates. This surface metallization may also be conductively coupled to the modular cup to improve the electrical characteristics of the feedthrough capacitor.

Preferably, a peripheral gap is provided between an outer periphery of the feedthrough capacitor and the modular cup.

The modular cup may also be directly conductively attached to the AIMD housing. Alternatively, the modular cup may include mounting tabs for conductive attachment to the ferrule. In this regard, pins may be utilized for attaching the modular cup to the ferrule.

Alternatively, the modular cup may include a ferrule mounting flange that includes at least one aperture for facilitating adhesive attachment between the modular cup and the ferrule. A braze connection may be provided between the ferrule and the ferrule mounting flange.

The present invention is also directed to a process for manufacturing an EMI filtered terminal assembly for an active implantable medical device (AIMD). The novel process comprises the steps of (1) installing a feedthrough capacitor at least partially into a modular cup such that a ground electrode plate or set of ground electrode plates is conductively coupled to the modular cup such that the assembled feedthrough capacitor and modular cup form a feedthrough capacitor subassembly, and (2) assembling the feedthrough capacitor subassembly to the hermetic terminal subassembly such that the at least one conductor or leadwire is conductively coupled to the active electrode plate or set of active electrode plates.

Preferably, the assembled feedthrough capacitor and hermetic terminal subassemblies are associated with the AIMD housing such that the conductor or leadwire extends through the AIMD housing in non-conductive relation.

The process further includes the step of subjecting the feedthrough capacitor subassembly to thermal cycles or shocks prior to its assembly to the hermetic terminal subassembly, as well as testing the mechanical characteristics of the feedthrough capacitor subassembly prior to its assembly to the hermetic terminal subassembly, and/or testing the electrical characteristics of the feedthrough capacitor subassembly prior to its assembly to the hermetic terminal subassembly.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 13 is a sectional view similar to FIG. 9, including an alternative modular cup design;

FIG. 14 is a fragmented perspective view of the alternative modular cup of FIG. 13;

FIG. 15 is a sectional view similar to FIG. 13, illustrating alternative placement of an insulation washer;

DETAILED DESCRIPTION OF THE PREFERRED EMBODIMENTS

Figure 1:
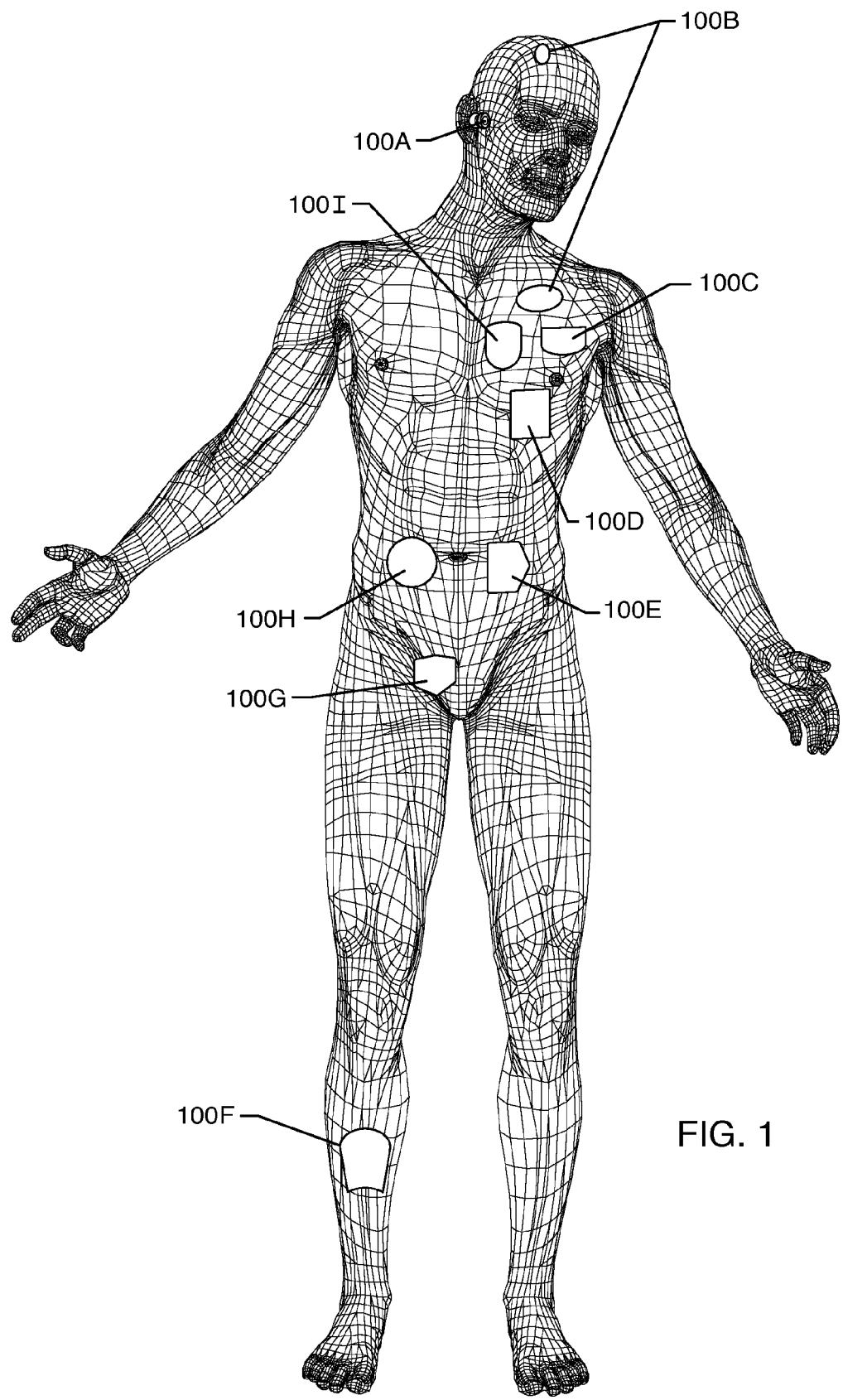
FIG. 1 is a wire formed diagram of a generic human body showing a number of implanted medical devices.

FIG. 1 is a wire formed diagram of a generic human body showing a number of implanted medical devices. 100A represents a family of hearing devices which can include the group of cochlear implants, piezoelectric sound bridge transducers and the like. 100B represents a variety of neurostimulators and brain stimulators. Neurostimulators are used to stimulate the Vagus nerve, for example, to treat epilepsy, obesity and depression. Brain stimulators are pacemaker-like devices and include electrodes implanted deep into the brain for sensing the onset of the seizure and also providing electrical stimulation to brain tissue to prevent the seizure from actually occurring. 100C shows a cardiac pacemaker which is well-known in the art. 100D includes the family of left ventricular assist devices (LVAD's) and artificial hearts. 100E includes an entire family of drug pumps which can be used for dispensing of insulin, chemotherapy drugs, pain medications and the like. 100F includes a variety of bone growth stimulators for rapid healing of fractures. 100G includes urinary incontinence devices. 100H includes the family of pain relief spinal cord stimulators and anti-tremor stimulators. 100I includes a family of implantable cardioverter defibrillators (ICD) devices and also includes the family of congestive heart failure devices (CHF). These are also known in the art as cardiac resynchronization therapy devices, otherwise known as CRT devices.

Figure 2:
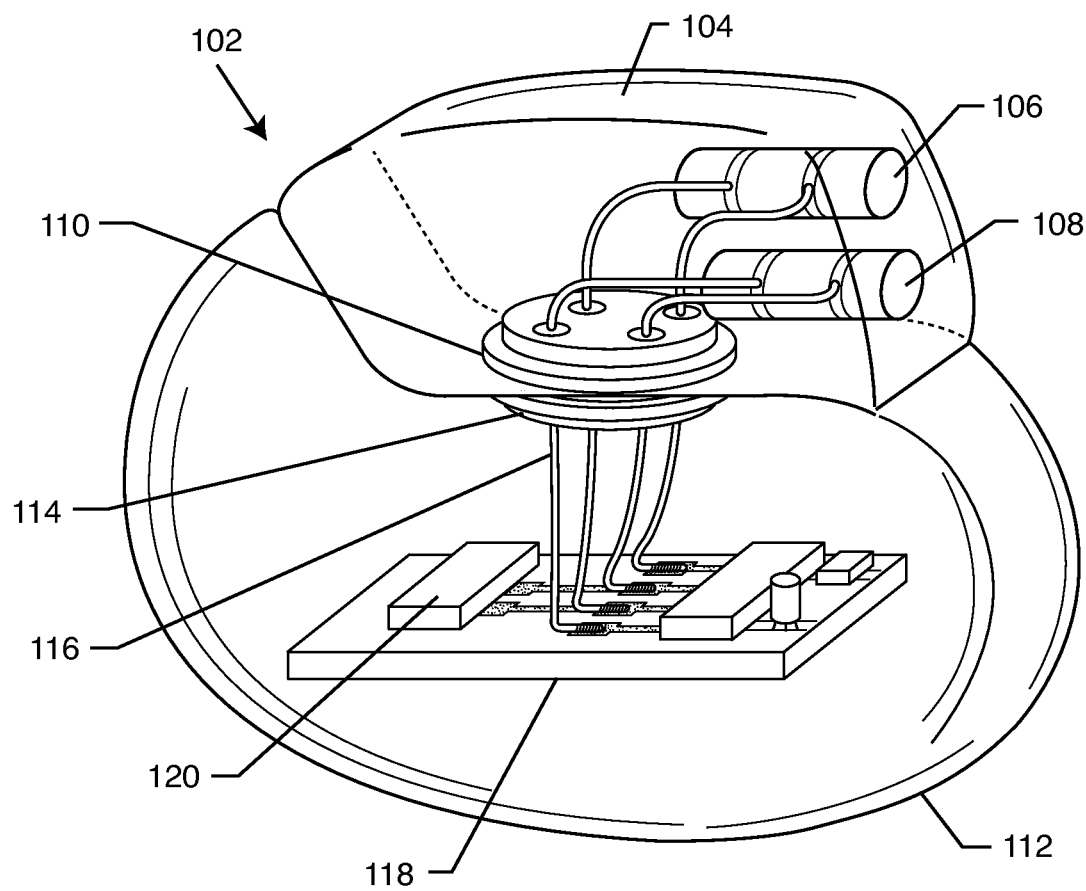
FIG. 2 illustrates a prior art active implantable medical device (AIMD) such as a cardiac pacemaker having an ISO standard IS-1 header block.

FIG. 2 illustrates a prior art AIMD 102, such as the cardiac pacemaker 100C. It has an ISO Standard IS-1 header block 104 and ports 106 and 108 for plugging in implantable leads (not shown). There is also a hermetic terminal assembly 110 which is generally laser welded to the conductive housing 112 of the AIMD. A feedthrough capacitor 114 is shown attached to the quad polar hermetic terminal 150. Conductors or leadwires 116 are routed to a circuit board 118 which has various electronic modules 120. The electronic modules of a cardiac pacemaker generally provide biological sensing, therapy delivery, programming and telemetry circuits.

Figure 3:
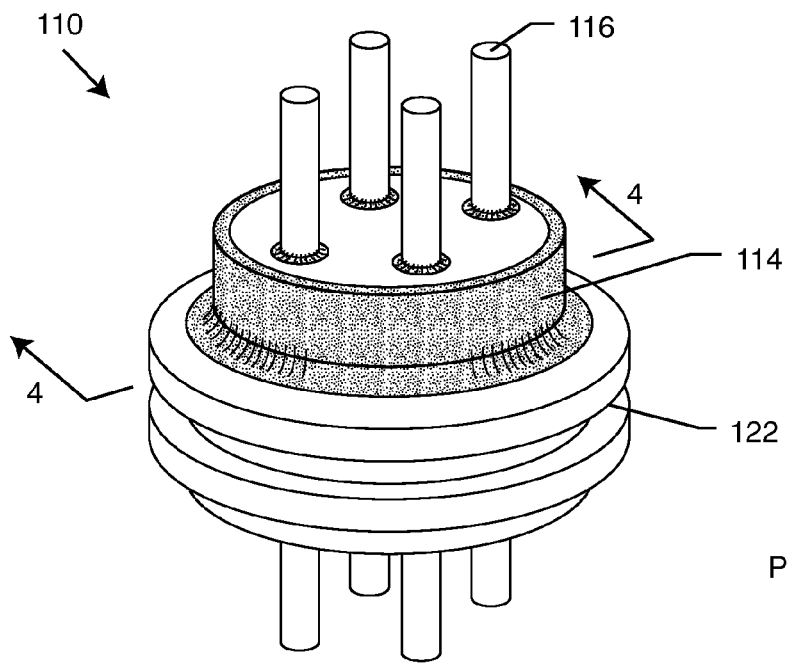
FIG. 3 is an inverted perspective view of the hermetic terminal assembly shown in FIG. 2.

FIG. 3 is an inverted isometric view of the hermetic terminal assembly 110 shown in FIG. 2. The quad polar feedthrough capacitor 114 is shown mounted directly to the ferrule 122 of the hermetic terminal assembly 110.

Figure 4:
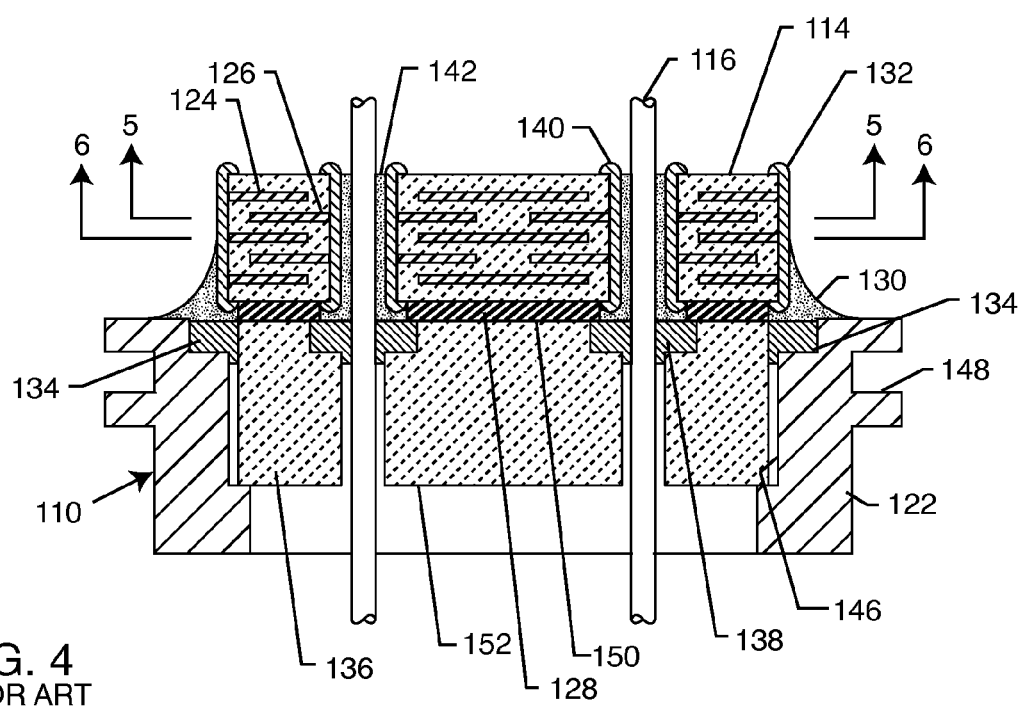
FIG. 4 is an enlarged cross-sectional view taken generally along the line 4-4 from FIG. 3.

FIG. 4 is a cross-sectional view taken generally from section 4-4 from FIG. 3. There are four feedthrough leadwires 116 which extend through the capacitor 114, which has a ground electrode plate set 124 and an active electrode plate set 126. The capacitor 114 is bonded with an insulating washer 128 to the hermetic terminal 110. An electrical attachment 130 is made using a thermal-setting conductive adhesive between the feedthrough capacitor outside diameter metallization 132 and gold braze surface 134. The necessity to make an oxide free attachment between the feedthrough capacitor and the ferrule is described in U.S. Pat. No. 6,765,779 which is incorporated herein by reference. An insulator 136 such as glass or alumina ceramic, is hermetically sealed to the ferrule 122 by means of gold braze 134. The four leadwires 116 are also hermetically sealed to the insulator 136 via gold braze rings 138 (there are four of these). The feedthrough capacitor active electrode plates 126 are attached by co-firing to the capacitor feedthrough hole inside diameter metallization 140. Conductive electrical material 142 is used to attach the metallization 140 to each one of the leadwires 116.

Figure 5:
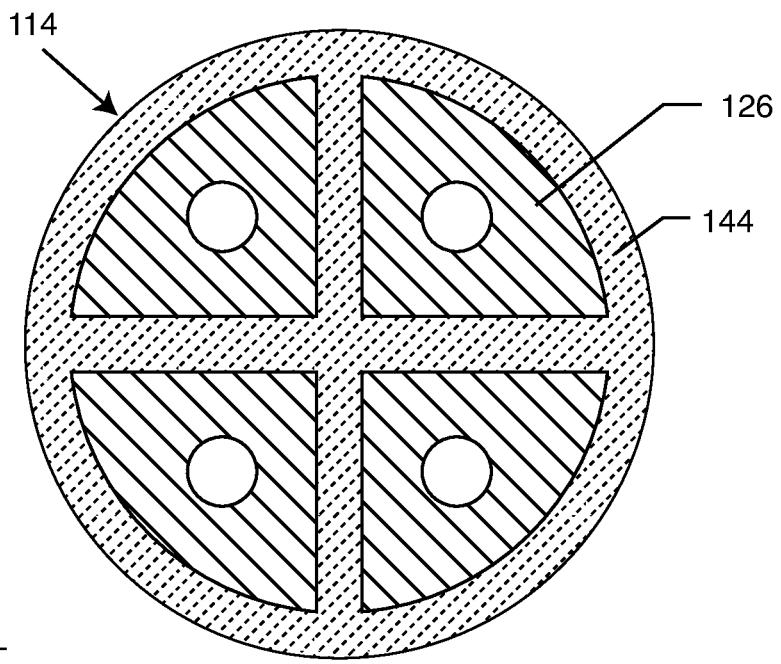
FIG. 5 is an enlarged sectional view taken generally along the line 5-5 from FIG. 4, illustrating configuration of active electrode plates within the feedthrough capacitor.

FIG. 5 is a cross-sectional view taken generally of section 5-5 from FIG. 4, illustrating the feedthrough capacitor active electrode plate set 126.

Figure 6:
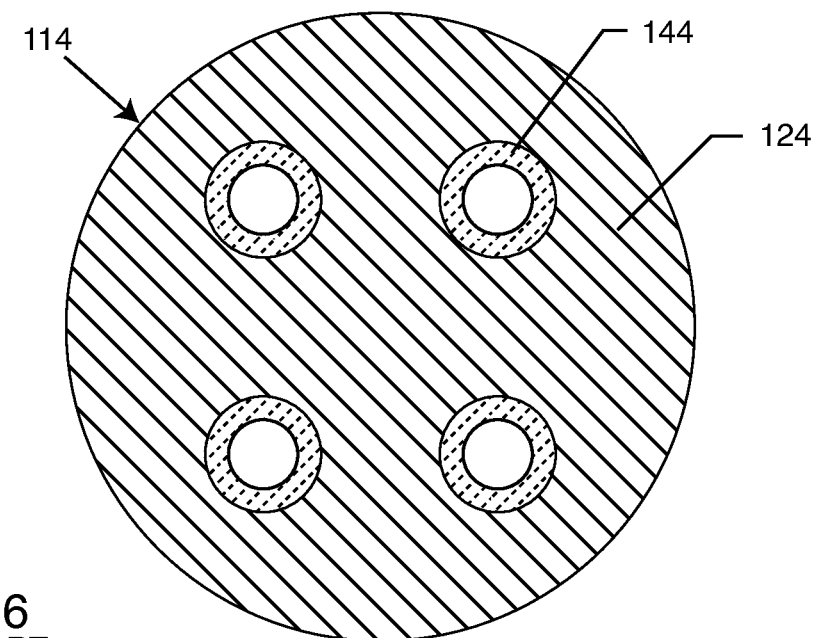
FIG. 6 is an enlarged sectional view taken generally along the line 6-6 from FIG. 4, illustrating the configuration of ground electrode plates within the feedthrough capacitor.

FIG. 6 is taken generally of section 6-6 from FIG. 4 and illustrates the ground electrode plate set 124.

Figure 7:
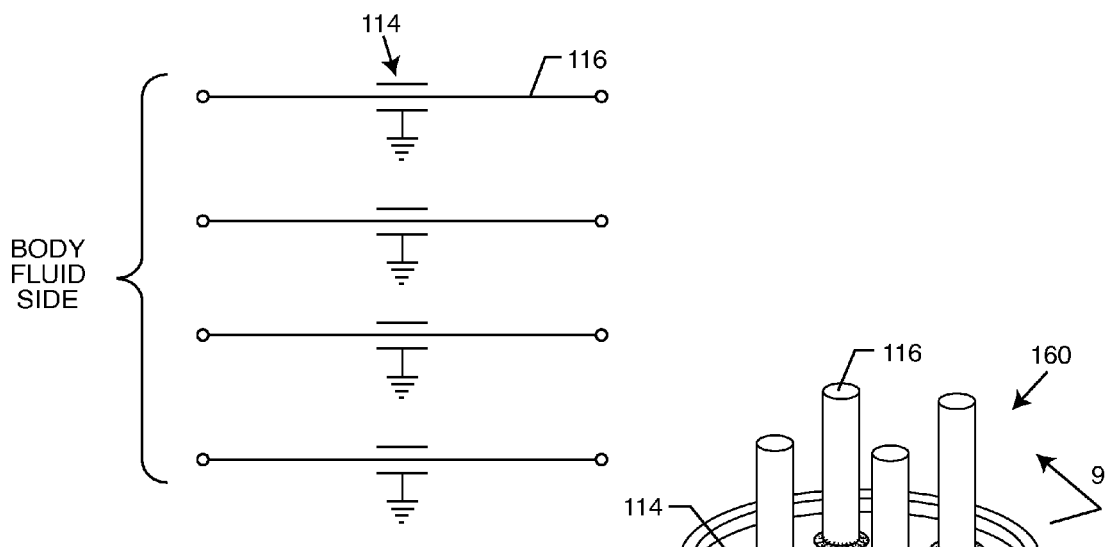
FIG. 7 is an electrical schematic diagram of the quadpolar feedthrough capacitor of FIGS. 3-6.

FIG. 7 is a schematic diagram of the quad polar feedthrough capacitor 114 of FIGS. 3 and 4.

Referring once again to FIG. 3, the feedthrough capacitor 114 and its associated hermetic terminal 110 in its prior art mounting means, are illustrated in FIGS. 2 through 4. The feedthrough capacitor 114 comprises a unitized dielectric structure or ceramic-based monolith 144 having multiple capacitor-forming conductive electrode plates formed therein. These electrode plates include a plurality of spaced-apart layers of first or active electrode plates 126 and a plurality of spaced-apart layers of second or ground electrode plates 124 in stacked alternating relation. The active electrode plates 126 are conductively coupled to the internal surface metallization layer 140 lining a passageway extending axially through the feedthrough filter capacitor 114. The ground electrode plates 124 include outer perimeter edges which are exposed at the outer periphery (or outside diameter) of the capacitor 114 where they are electrically connected in parallel by a suitable conductive surface, such as the surface metallization layer 132. The number of active and ground electrode plates 126 and 124, together with their area and the dielectric thickness or spacing there between, varies in accordance with the desired capacitance value and voltage rating of the feedthrough capacitor 114.

In the prior art, the feedthrough capacitor 114 and terminal pin or leadwire 116 are assembled to the hermetic terminal 110 as shown in FIGS. 3 and 4. Feedthrough capacitor hermetic terminal assemblies are more thoroughly described in U.S. Pat. No. 5,333,095, the contents of which are incorporated herein by reference. The hermetic terminal includes a ferrule 122 which comprises a generally ring-shape or rectangular structure formed from a suitable biocompatible conductive material, such as titanium or a titanium alloy, and defines a central aperture 146 and a radially outwardly opening channel 148 for facilitated assembly with a test fixture (not shown) for hermetic seal testing, and also for facilitated assembly with the AIMD housing 112 on an implantable medical device or the like. An insulating structure 136 is positioned within the central aperture 146 to prevent passage of fluid, such as patient body fluids, through the hermetic terminal assembly 110 during normal use implanted within the body of a patient. More specifically, the hermetic terminal assembly 110 comprises an electrically insulating or dielectric structure 136 such as a gold brazed alumina or fused glass type or ceramic-based insulator installed within the ferrule central aperture 146. Insulating structure 136 is positioned relative to an adjacent axial side of the feedthrough capacitor 114 and cooperates therewith to define a connection therebetween. A gap may be left between the filter feedthrough capacitor 114 and the facing side of the insulating structure 136 to form a portion of the leak detection vent and to facilitate leak detection testing of the assembly. Leak detection vents are more thoroughly described in U.S. Pat. No. 6,566,978, the contents of which are incorporated herein by reference. The insulating structure 136 thus defines an in-bore face 150 presented in a direction axially towards the adjacent feedthrough capacitor body 114 and an opposite out-bore face 152 presented in a direction axially away from the capacitor body towards body fluids and tissues. The insulating structure 136 desirably forms a fluid-tight seal about the inner diameter surface of the conductive ferrule 122 and also forms a fluid-tight seal about each one of the four terminal pins 116 thereby forming a hermetic seal suitable for human implant. Such fluid impermeable seals are formed by inner and outer brazed seals 138, 134 or the like. The insulating structure 136 thus prevents fluid migration or leakage through the ferrule 122 along any of the structural interfaces between the components mounted within the ferrule, while electrically isolating the terminal pins 116 from the ferrule 122.

The feedthrough filter capacitor 114 is often mechanically and conductively attached directly to the conductive ferrule 122 by means of peripheral material 130 which conductively couples the capacitor outer metallization layer 132 to a surface of the ferrule while maintaining an axial gap between a facing surface of the capacitor body 144 on the one hand, and surfaces of the insulating structure 136 and ferrule 122 on the other. The axial gap (not shown in FIGS. 3 and 4) must be small enough to preclude leakage of EMI. The outside diameter connection 130 between the capacitor 114 and the hermetic terminal ferrule 122 is accomplished typically by using a high temperature conductive thermal-setting material, such as a conductive polyimide. Properly dispensing this material and curing it is a very labor intensive process. It will be noted that in FIGS. 3 and 4 that the peripheral capacitor attachment material 130 is preferably discontinuous to reduce the mechanical stress and also allow for passage of helium during hermetic seal testing of the complete assembly. In other words, there are substantial gaps between the outside diameter electrical connections 130 which allow for passage of helium during a leak detection test.

Referring once again to FIGS. 3 and 4, making electrical attachment connection between the four feedthrough capacitor inside diameter passageways and each of the leadwires 116 with a suitable conductive material 142 is quite problematic. In the past, high temperature solders were attempted. The problem is that when the flange 122 is laser welded into the overall housing 112 of an AIMD 102, a very substantial temperature rise occurs. This tends to reflow any solders that are used in this assembly. Accordingly, in the prior art, electrical connection materials 130 and 142 are typically of a thermal-setting conductive polymer, such as a conductive polyimide. Dispensing this polyimide into such a small space is a very difficult and time consuming process. In general, a hand held syringe is used to dispense a small amount of the conductive material 142. Then the entire assembly is centrifuged. Then there is a pre-cure followed by a micro-blasting abrasive cleaning operation and then a visual inspection. Then more electrical material 142 is added with a syringe and this entire process is repeated up to five or even seven times until a complete void-free fill is achieved. This repetitive process is one of the main cost drivers in the prior art and is highly undesirable.

In operation, the coaxial feedthrough capacitor 114 permits passage of relatively low frequency signals along the terminal pins or leadwires 116 while shielding and decoupling/attenuating undesired electrical interference (EMI) signals of typically high frequency to the conductive housing 112. Typical high frequency emitters for which the feedthrough capacitor 114 offers protection include microwave ovens, cellular telephones and the like. Feedthrough capacitors of this general type are available in unipolar (one), bipolar (two), tripolar (three), quadpolar (four), pentapolar (five), hexpolar (six) and additional lead configurations. The feedthrough capacitors (both discoidal and rectangular configurations) of this general type are commonly employed in all types of AIMDs including implantable cardiac pacemakers, defibrillators and the like, wherein the pacemaker housing is constructed from a biocompatible metal such as titanium alloy, which is electrically and mechanically coupled to the hermetic terminal assembly which in turn is electrically coupled to the feedthrough filter capacitor. As a result, the filter capacitor 114 and terminal pin or leadwire 116 assembly prevents entrance of interference signals to the interior of the pacemaker housing 112, wherein such interference signals could otherwise adversely affect the desired cardiac pacing or defibrillation function.

The attachment between the capacitor outside diameter metallization 132 (ground electrode plates 124) and the titanium ferrule 122 is accomplished using a thermal-setting conductive adhesive 130, such as a conductive polyimide. Ablestick Corporation manufactures such polyimide compounds. It is important that an oxide-free metallurgical electrical connection be made between the capacitor outside diameter metallization 132 and the ferrule 122. This is important so that the feedthrough capacitor 114 acts as an effective electromagnetic interference filter. It is essential that the capacitor ground electrode plates 124 have a very low resistance and low impedance connection at RF frequencies to the ferrule 122 (or the AIMD housing 112). This is essential so that it can perform as a proper high frequency bypass element (3-terminal transmission line) which will short out undesirable EMI such as that caused by cellular telephones and other emitters. For example, if an oxide layer is present, such as an oxide of titanium, it can create a high resistance connection which can degrade insertion loss. Reference is made to U.S. Pat. No. 7,765,779 which is incorporated herein by reference.

In the following description of the present invention, components which are functionally equivalent with those described in connection with the prior art hermetic terminal assembly will retain the same reference numbers.

Figure 8:
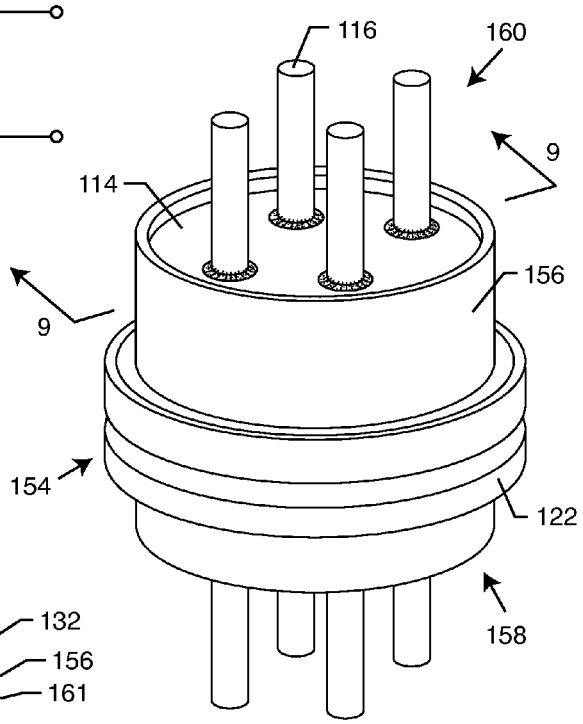
FIG. 8 is a perspective view of a quadpolar EMI filtered terminal assembly similar to that illustrated in FIG. 3, except for its modular construction in accordance with the present invention.

FIG. 8 is an isometric view of a quad polar modular EMI filtered hermetic terminal assembly 154 that has a novel modular cup 156 embodying the present invention, which houses a feedthrough capacitor 114. The cup 156 is attached to the ferrule 122 of a hermetic terminal subassembly 158. Titanium housings, casings and ferrules for hermetic seals are commonly used in the medical implant industry. Pacemakers, implantable defibrillators, neurostimulators and the like, generally have ferrules or titanium-ceramic composite structures. Stainless steel, particularly in legacy products, can also be used. All of the aforementioned devices are also subject to electromagnetic interference (EMI) from emitters that are commonly found in the patient environment. These include cell phones, microwave ovens and the like.

A feedthrough capacitor 114, when mounted at the point of ingress of AIMD leads 116, makes a very effective EMI filter. However, as previously described, installation of the feedthrough capacitor 114 is a very time consuming and expensive process. One problem is that attachment to titanium or stainless steel is very difficult to achieve. For example, titanium surfaces tend to oxidize. In addition, materials such as solder do not wet to titanium.

The present invention resides in a novel feedthrough capacitor subassembly 160 disposed adjacent to the hermetic terminal subassembly 158, which includes a conductive modular cup 156 conductively coupled to the AIMD housing 112, and a feedthrough capacitor 114 disposed within the modular cup 156 such that a first electrode plate or set of electrode plates 126 is conductively coupled to the leadwire(s) 116, and a second or ground electrode plate or set of electrode plates 124 is conductively coupled to the modular cup 156. The modular cup 156 is generally manufactured of an inexpensive compliant material such as copper. When the cup 156 is of thin wall copper or equivalent, construction, it can expand and contract with the feedthrough capacitor 114 and thereby prevent excessive stresses from being applied to said capacitor. Electrical attachment to copper is facilitated by first providing a nickel and then gold or tin plating on the copper. This makes the copper readily solderable. Since the modular cup 156 is disposed on the inside of the hermetically sealed AIMD housing 112, it is not necessary that the material from which the cup 156 is formed be non-toxic and biocompatible. In other words, any material can be used. The modular cup 156 offers several unique advantages including: (1) it can be made from a very low cost copper or brass stamping; (2) it is readily electroplated through inexpensive barrel plating processes; (3) it can be made of very thin-wall and soft material such as copper such that during application of thermal or piezoelectric stress, the capacitor is protected from cracking due to the presence of dissimilar materials; and (4) a very high temperature solder can be used to connect the outside diameter metallization 132 of the feedthrough capacitor 114 to the inside diameter of the modular cup 156. Another major advantage is that the capacitor 114 can be pre-assembled into the cup 156, then cleaned, visually inspected and electrically tested. All that is left is for the feedthrough capacitor subassembly 160 to be attached to either the ferrule 122 or directly to the housing 112 of the AIMD 102 to complete the assembly 154.

Figure 9:
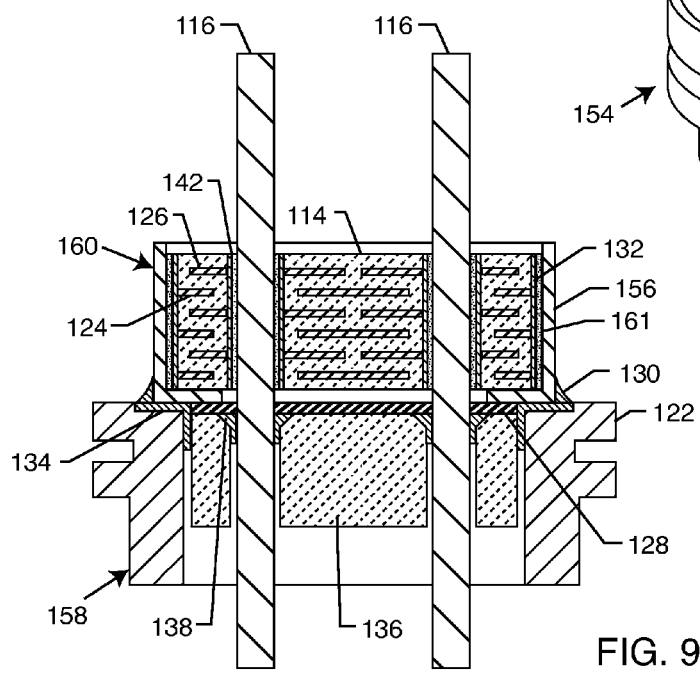
FIG. 9 is a sectional view taken generally along the line 9-9 from FIG. 8.

FIG. 9 is a cross-sectional view taken generally of section 9-9 from FIG. 8. This shows the modular cup 156 and the feedthrough capacitor 114, including the active electrode plate set 126 and the ground electrode plate set 124, in cross-section. The cup 156 is attached by electrical connection 130 to the ferrule 122. For the attachment material 130, a high melting point solder is a preferred embodiment. This could be a high lead content solder, which is malleable, or even a relatively brittle solder, such as those containing gold. Since the attachment is not being made directly to the feedthrough capacitor 114, this opens up a much wider range of attachment materials including relatively brittle solders, brazes and welds. In a preferred embodiment, the cup 156 is attached to a gold braze pad 134 which is free of oxides. During the manufacturing of the hermetic terminal, the insulator 136 is mechanically and hermetically attached to the leadwires 116 and also the ferrule 122 by gold brazes 134 and 138. An insulating washer 128 is disposed, in this case, between the cup 156 and the upper surface of the ferrule 122. It is not necessary that the electrical attachment material 130 between the cup 156 and the ferrule 122 be 360 degrees continuous. In fact, it only needs to be attached in a few places in order to provide adequate EMI filtering.

A major advantage of the modular cup subassembly 160 of FIGS. 8 and 9 is that the feedthrough capacitor 114 can be preassembled to the modular cup 156 by forming a high temperature electrical connection 161 between the feedthrough capacitor outside diameter metallization 132 and the inside diameter of the modular cup 156. For example, this connection could be made using an almost pure lead solder such as AG 1.5. This particular solder has a melting point above 300 degrees C. This is usually a very difficult solder to work with as it does not flow well in air or with normal fluxes. One would hesitate to use a very active flux in a prior art feedthrough capacitor hermetic seal subassembly as illustrated in FIGS. 3 and 4. However, it would be a relatively easy matter to form the high temperature connection 161 while the modular cup was in a reducing gas atmosphere-type of soldering kiln. Also one could use very aggressive fluxes which are then easily cleaned off in a subassembly (before the modular cup 156 was attached to the relatively delicate hermetic terminal subassembly 158). By having a high temperature outside diameter solder connection 161, it is much easier to install the modular cup to the hermetic seal in a subsequent (lower temperature) attachment process.

Figure 10:
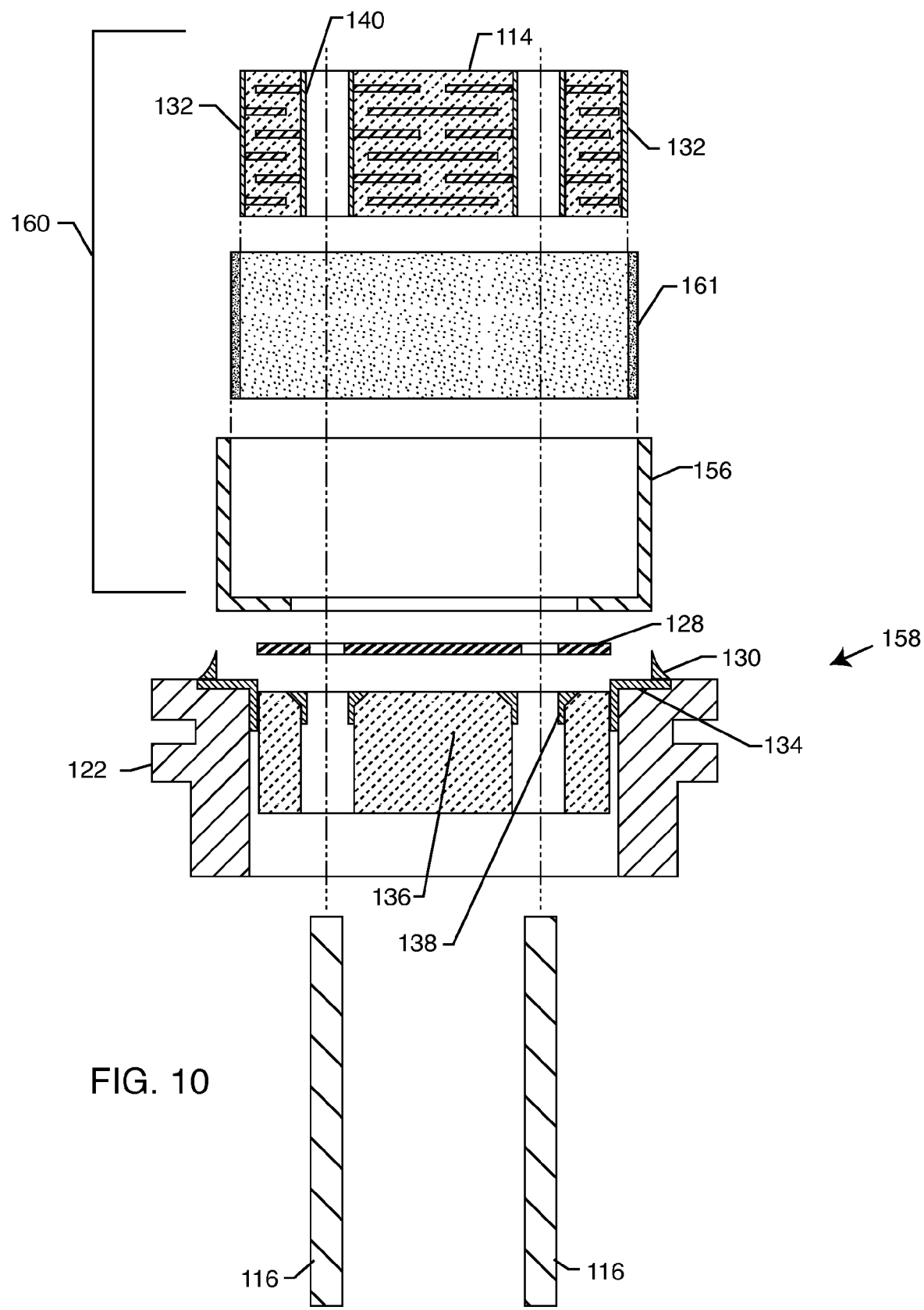
FIG. 10 is an exploded sectional view of the terminal assembly of FIG. 9, showing assembly of the feedthrough capacitor to the modular cup.

FIG. 10 is taken from FIGS. 8 and 9 and is an exploded view showing the assembly steps. First, the feedthrough capacitor 114 is preassembled into the modular cup 156. As previously described, in a preferred embodiment, the outside diameter metallization 132 of the feedthrough capacitor is connected to the inside diameter of the modular cup using a high temperature solder 161. Also shown is the hermetic terminal subassembly 158. After the feedthrough capacitor subassembly 160 is formed, it is cleaned, tested and inspected. Tests may include visual examinations to make sure the capacitor surfaces are free of defects. Electrical tests may be preceded by thermal cycling or thermal shock sequence. Subsequent electrical tests may include dielectric withstanding voltage tests, insulation resistance tests, capacitance, dissipation factor, equivalent series resistance and even accelerated burn-in tests. Burn-in typically consists of several thermal shocks or cycles followed by exposure to an elevated temperature such as 125 degrees C. with a multiple of rated voltage applied to each of the feedthrough capacitor pins as referenced to ground (the cup 156). The purpose of this testing is to eliminate manufacturing defects and infant mortality from the feedthrough capacitor subassembly 160 prior to its attachment to the relatively expensive hermetic terminal subassembly 158. The feedthrough capacitor subassembly 160 may be then inventoried until it's ready to be assembled to either an AIMD housing 112 or the hermetic terminal subassembly 158. There are a number of obvious inventory and logistical advantages to this.

Figure 11:
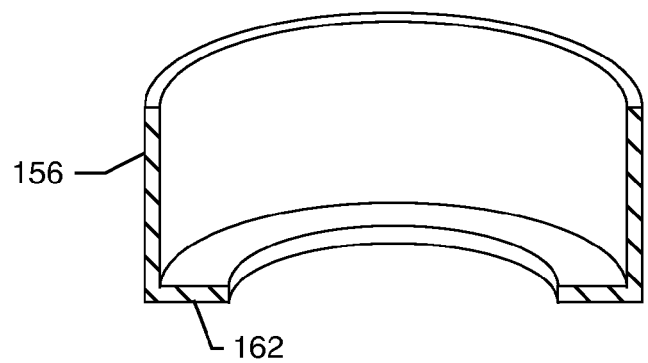
FIG. 11 is a fragmented perspective view of the modular cup of FIG. 10.

FIG. 11 is an isometric sectional view of the cup 156 taken from FIG. 10. In this case, the cup 156 has a partial webplate 162 with a large center hole.

Figure 12:
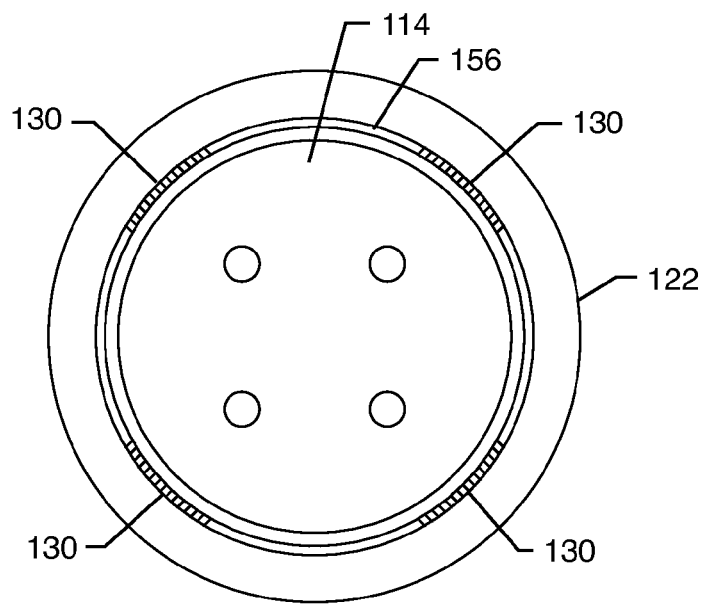
FIG. 12 is a top plan view of the assembly of FIGS. 8 and 9.

FIG. 12 is a top view of the assembly of FIGS. 8 and 9, showing that the electrical connection material 130 can be discontinuous and still be effective.

FIG. 13 is very similar to FIG. 9 except that the cup 156 has more of a closed webplate 162 design. This is easily seen in the cup sectional view in FIG. 14 where the webplate 162 is closed with clearance holes 164 for passage of the leadwires 116 in non-conductive relation. Referring once again to FIG. 13, we can see that the insulating washer 128 is disposed between the bottom of the cup 156 and the top of the hermetic terminal subassembly 158.

FIG. 15 illustrates an alternative placement of the insulating washer 128. This is a preferred embodiment in which the insulating washer 128 is disposed between the feedthrough capacitor 114 and the bottom of the modular cup 156.

In an alternative embodiment, the insulating washer 128 can be disposed between the modular cup 156 and the surface of the hermetic seal 150 as illustrated in FIG. 13 and in addition also be disposed between the feedthrough capacitor 114 and the modular cup webplate 162 as illustrated in FIG. 15.

Referring back to FIGS. 10, 13 and 15, it is desirable to first form the feedthrough capacitor subassembly 160 which includes a feedthrough capacitor 114 installed into the modular cup 156. This is because the hermetic terminal subassembly 158 is the most expensive part of the entire assembly. In general, because the hermetic terminal subassembly 158 is exposed directly to body fluids, it must be built entirely of biocompatible and non-toxic materials. For example, the leadwires 116 are typically of very expensive materials such as platinum or platinum-iridium alloy. In addition, the alumina ceramic insulator 136 and the gold brazes 134 and 138 are also quite expensive. In addition, there is a machined titanium ferrule 122 which is expensive in its own right.

Therefore, it is not unusual for 80% of the cost of the overall filtered hermetic terminal 154 to be attributable to the cost of the hermetic terminal subassembly 158 itself. This is why it is important that the feedthrough capacitor 114 be preassembled into the cup 156 and thoroughly thermally and electrically tested. In this way, there's a greatly reduced chance of electrical failure of the feedthrough capacitor 114 once it is installed onto the hermetic terminal subassembly 158. A failure at this point, results in scrapping of the entire assembly including the relatively expensive hermetic terminal subassembly 158. It is far better to scrap just the feedthrough capacitor 114 and its relatively inexpensive modular cup 156 then to scrap the entire assembly 154.

Figure 16:
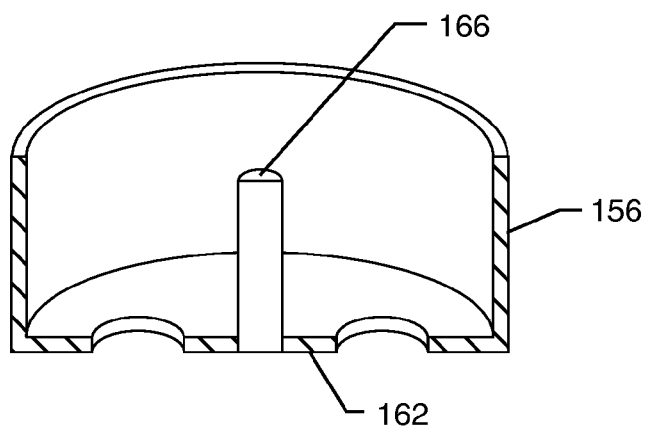
FIG. 16 is a fragmented perspective view of another alternative modular cup which includes a grounded pin for internal grounding of the feedthrough capacitor.

FIG. 16 is very similar to FIG. 14 except that a ground pin 166 has been added in the center of the cup webplate 162. The ground pin 166 is to facilitate connection to internal ground plates 124 of a feedthrough capacitor 114. One is referred to U.S. Pat. No. 5,905,627 the contents of which are incorporated herein. The '627 patent describes internally grounded feedthrough capacitors. One is also referred to U.S. Pat. No. 6,529,103; U.S. Pat. No. 6,765,779; and U.S. Pat. No. 6,765,780 which also describe internally grounded feedthrough capacitors and/or attachment to oxide free biostable surfaces.

Figure 17:
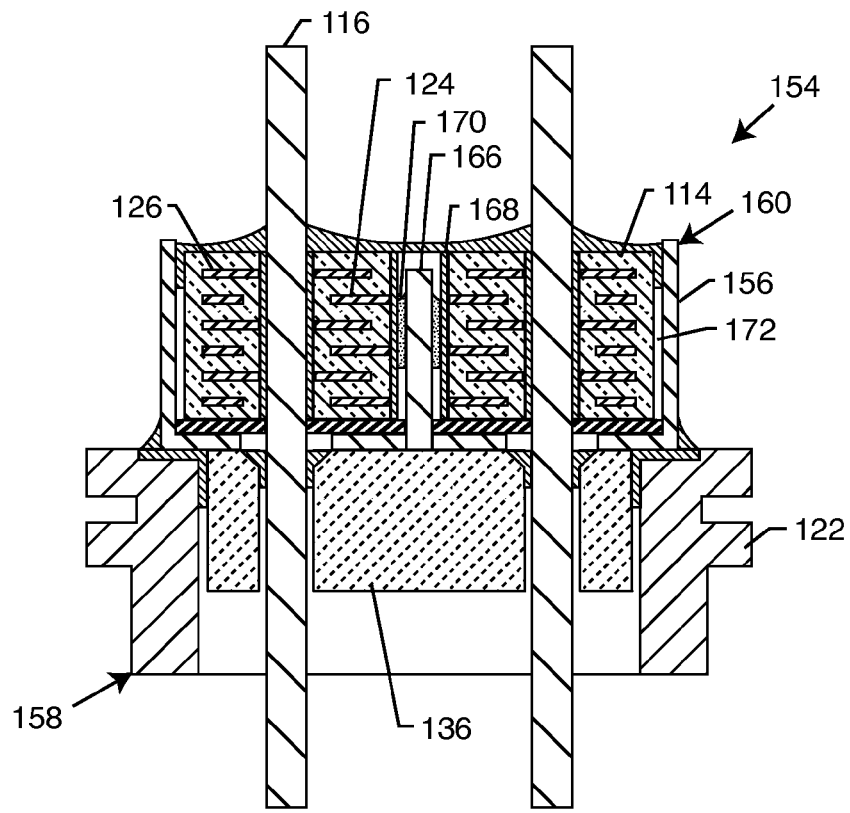
FIG. 17 is a cross-sectional view similar to FIG. 15, illustrating construction of the EMI filtered terminal assembly utilizing the internal ground modular cup of FIG. 16.

FIG. 17 is a cross-section very similar to FIG. 15 except that the cup 156 with ground pin 166 of FIG. 16 is used along with a feedthrough capacitor 114 that is internally grounded in accordance with U.S. Pat. No. 5,905,627. In this case, there is no need for any electrical connection between the outside diameter of the capacitor 114 and the inside diameter of the cup 156. As one can see in the cross-section, the active electrode plates 126 are conventional in that they are associated with each individual leadwire 116. Referring back to FIG. 5, the active electrode plates 126 of FIG. 17 are very much the same. However, the ground electrode plate set 124 is quite different. In this case, the ground electrode plate set 124 is electrically connected to the center pin 166. The inside diameter hole of the feedthrough capacitor 114 has been previously metalized 168. An electrical connection 170, which consists of solder or the like, is formed between the metallization 168 and the ground pin 166. There are several advantages to the assembly 154 as shown in FIG. 17. By elimination of the outside diameter electrical connection to the capacitor, a gap 172 is left. As the capacitor 114 expands and contracts or the cup 156 expands and contracts, no mechanical stress is transmitted to the feedthrough capacitor 114. Also the assembly is greatly simplified.

Figure 18:
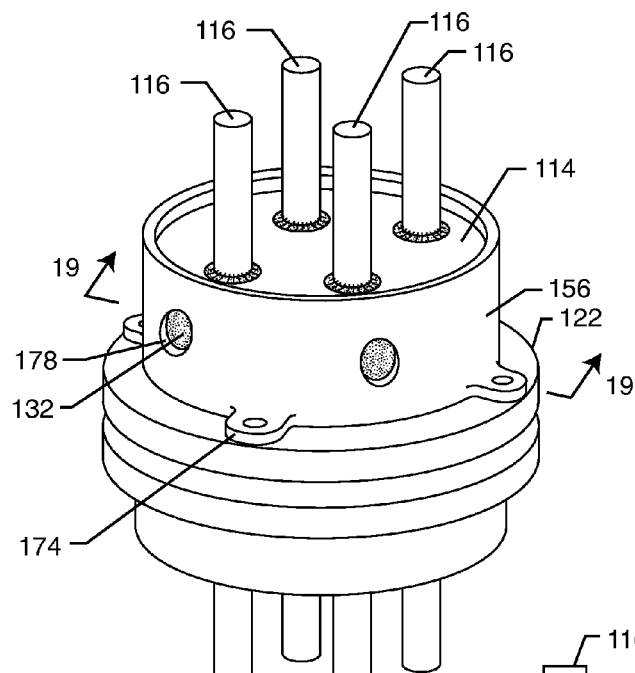
FIG. 18 is similar to FIG. 8, illustrating another alternative form of modular cup.
Figure 20:
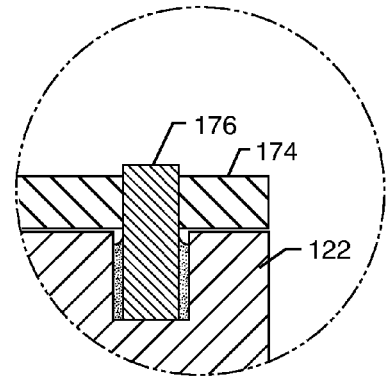
FIG. 20 is an enlarged fragmented sectional view of the area indicated by the number 20 in FIG. 19.
Figure 19:
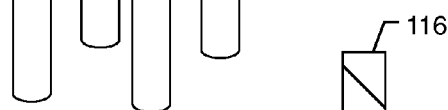
FIG. 19 is a sectional view taken generally along the line 19-19 from FIG. 18.

FIG. 18 is very similar to FIG. 8 except that it shows several other options for the modular cup 156. Referring to FIG. 18, one can see that this particular modular cup 156 has four tabs 174. Attachment between the tabs 174 and the ferrule 122 can be done by solders, thermal-setting conductive adhesives, laser welds, brazing or the like. As illustrated in FIGS. 19 and 20, mounting pins 176 can be used to facilitate the mounting of the tabs 174 as well. Referring once again to FIG. 18, one can see that there are optional holes 178 in the side of the cup assembly 156. These can be used to facilitate an electrical connection between the cup 156 and the outside diameter metallization 132 of the feedthrough capacitor 114. Installation of the feedthrough capacitor 114 into the cup 156 is quite easy by use of multiple holes 178. One could inject a small amount of thermal-setting conductive adhesive or solder in each hole 178 and that is all the electrical attachment that would be needed.

Figure 21:
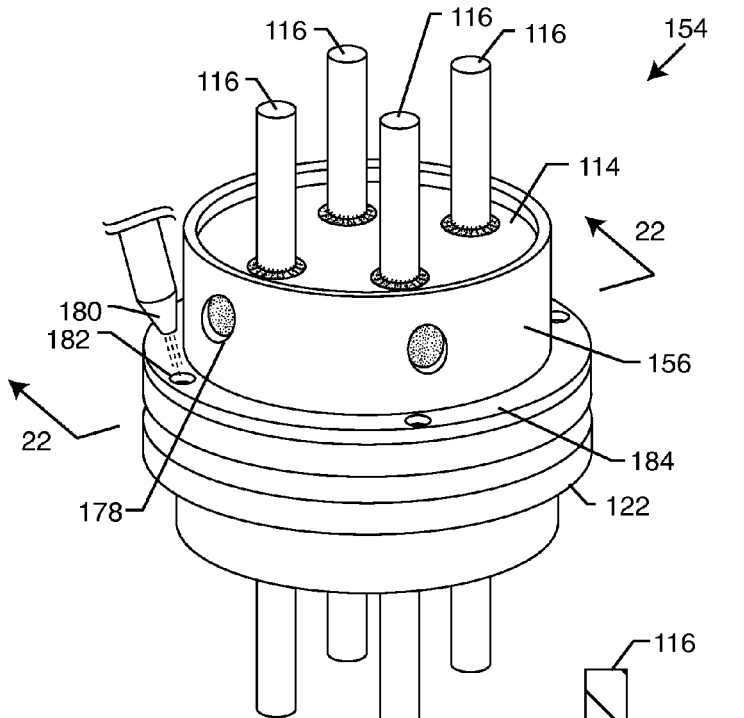
FIG. 21 is a perspective view similar to FIG. 18, illustrating another type of modular cup and use of a syringe tip utilized for injecting thermal-setting conductive epoxy, solder paste or the like to conductively couple the modular cup to a ferrule.

FIG. 21 illustrates a syringe tip 180 which is connected either to a tube or tubing system which can inject a thermal-setting conductive epoxy, a solder paste or the like. In a preferred embodiment, this would be controlled by a robotic dispensing system. The syringe 180 could be replaced by a laser welding head wherein laser spot welds were also formed in each one of the holes 182. Alternatively, brazes or laser welds or other types of welds could be used. In this case, the conductive material is being disposed into holes 182 on a novel web flange 184 of the cup 156. FIG. 21 illustrates a continuous web flange 184 on the cup 156 as opposed to tabs 174 shown in FIG. 18. A very similar robotic dispensing or weld technique could also be used to dispense electrical attachment material into the holes 178.

Figure 22:
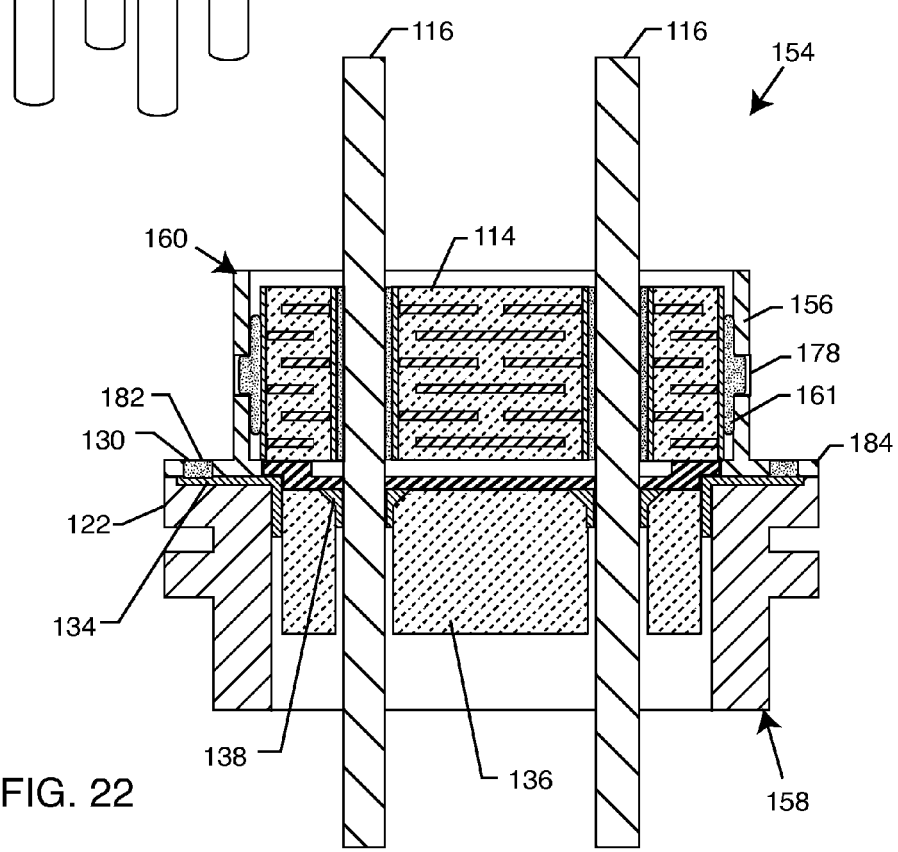
FIG. 22 is a sectional view taken generally along the line 22-22 from FIG. 21.

FIG. 22 is a cross-sectional view taken from section 22-22 from FIG. 21. One can see that there is an electrical connection 130 through the flange hole 182 to the gold braze 134 of the hermetic terminal flange 122. This forms an oxide free connection to the flange 122. The importance of oxide free electrical attachment is described in U.S. Pat. No. 6,765,779.

Figure 23:
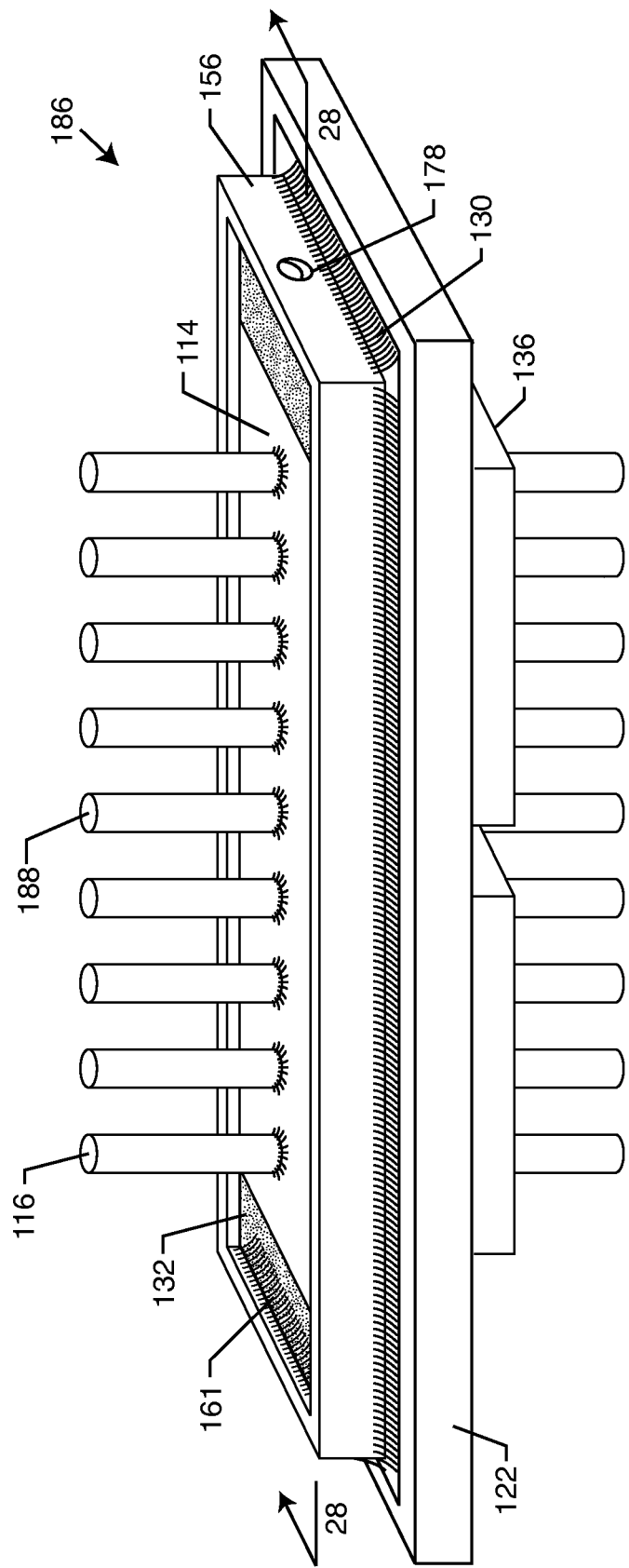
FIG. 23 is a perspective view of an octapolar plus ground EMI filtered hermetic terminal assembly embodying the present invention.

FIG. 23 illustrates an octapolar (plus ground) inline EMI filtered hermetic terminal assembly 186. This is a hybrid internal ground structure which is further described in U.S. Pat. No. 7,765,780. In this case, the feedthrough capacitor 114 is attached to the ferrule 122 (ground) at its ends and also through a ground pin 188 at its center.

Figure 24:
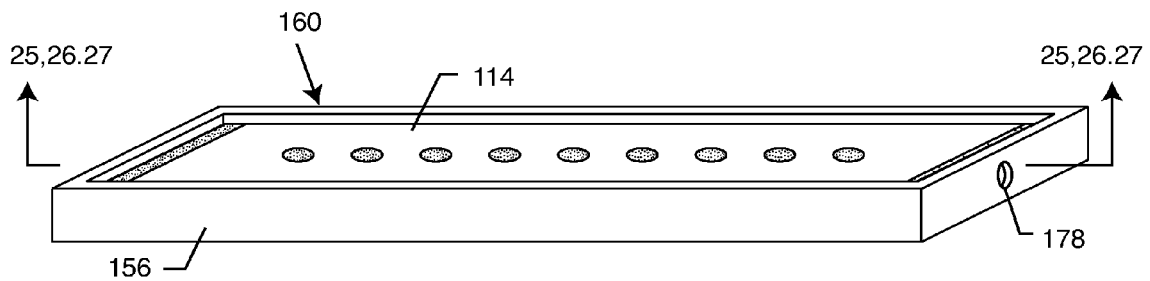
FIG. 24 is a perspective view of the feedthrough capacitor subassembly utilized in connection with the hermetic terminal assembly of FIG. 23.

FIG. 24 is taken from FIG. 23 and illustrates the feedthrough capacitor subassembly 160.

Figure 25:
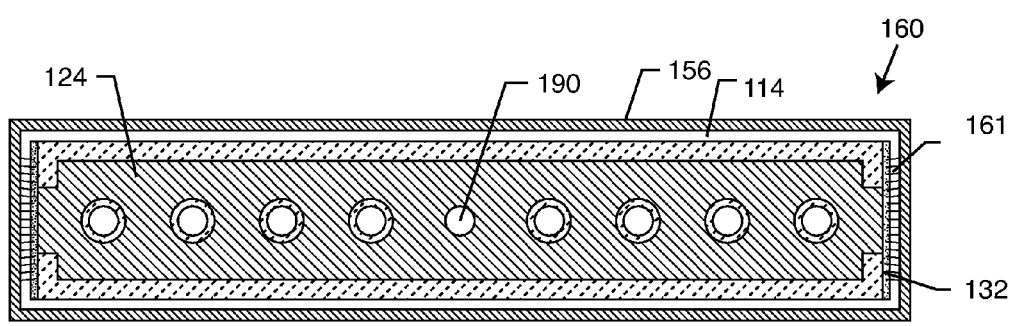
FIG. 25 is a sectional view taken generally along line 25-25 from FIG. 24, illustrating the configuration of ground electrode plates within the feedthrough capacitor.

FIG. 25 is taken from section 25-25 from FIG. 24 and illustrates the ground electrode plate stack 124. The ground electrode plates 124 are shown connected to the cup 156 on both its right and left ends and also to the center hole 190 which would engage ground pin 188 as shown.

Figure 26:
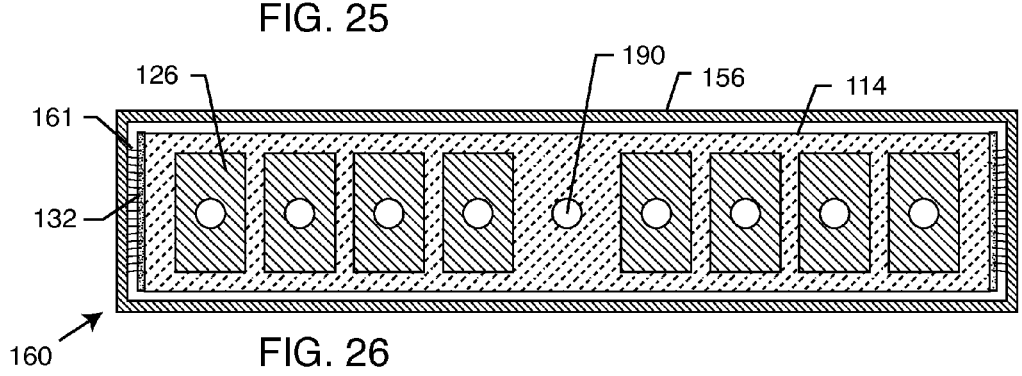
FIG. 26 is a sectional view taken generally along the line 26-26 from FIG. 24, illustrating the configuration of active electrode plates within the feedthrough capacitor.

FIG. 26 is taken from section 26-26 from FIG. 24. Shown are the eight active electrode plates 126 each of which in turn is connected to a terminal pin 116 as illustrated in FIG. 23. It is the overlap of the effective capacitance area of each active electrode plate 126 and the ground plates 124 which forms each individual feedthrough capacitor.

Figure 27:
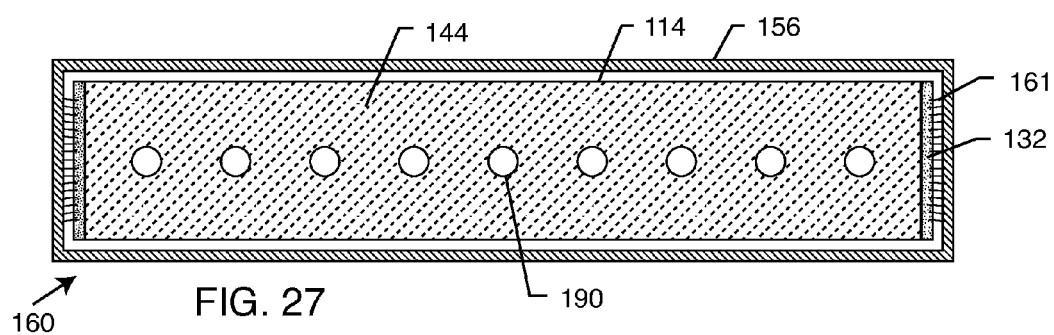
FIG. 27 is a sectional view of interleaving layers of dielectric material disposed between the active and ground electrode plates of FIGS. 26 and 27.

FIG. 27 is taken from section 27-27 of FIG. 24, and illustrates the capacitor dielectric layers 144 between the ground electrode plates 126 and the active electrode plates 124. The electrical connections on both the left and right end of the feedthrough capacitor 114 are also shown.

Figure 28:
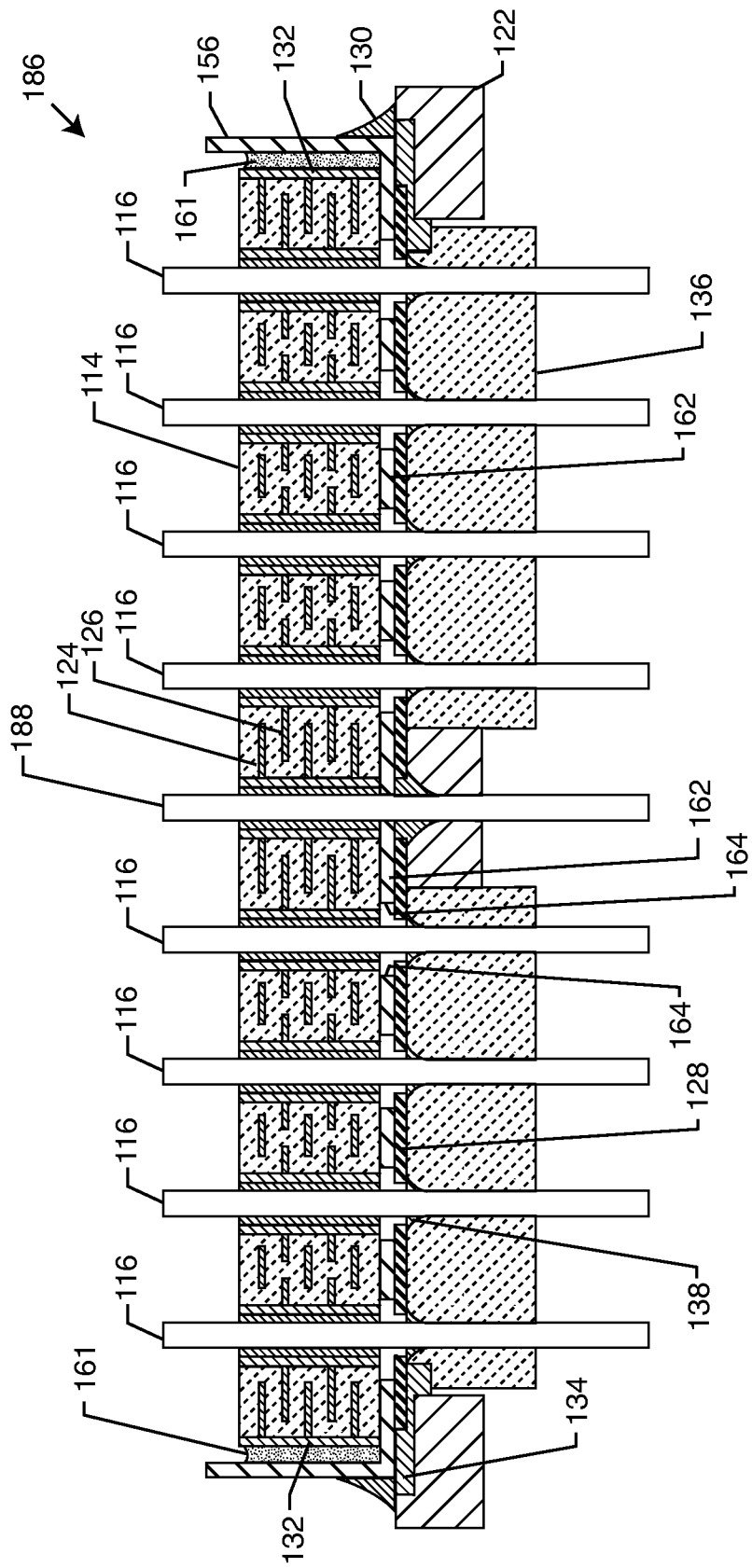
FIG. 28 is a sectional view taken generally along the line 28-28 from FIG. 23.

FIG. 28 is a sectional view of the inline octapolar hermetic terminal assembly 186 illustrated in FIG. 23. Referring to FIG. 28, the cup 156 has a continuous webplate 162 with through holes 164. Ground pin 188 is connected to this webplate 162 where it gets an effective RF ground. As can be seen, the capacitor ground electrode plates 124 are connected to the ground pin 188 and also to the left and right sides of the feedthrough capacitor metallization 132 and in turn, through electrical connection 161 to the inside surface of the cup 156.

Figure 29:
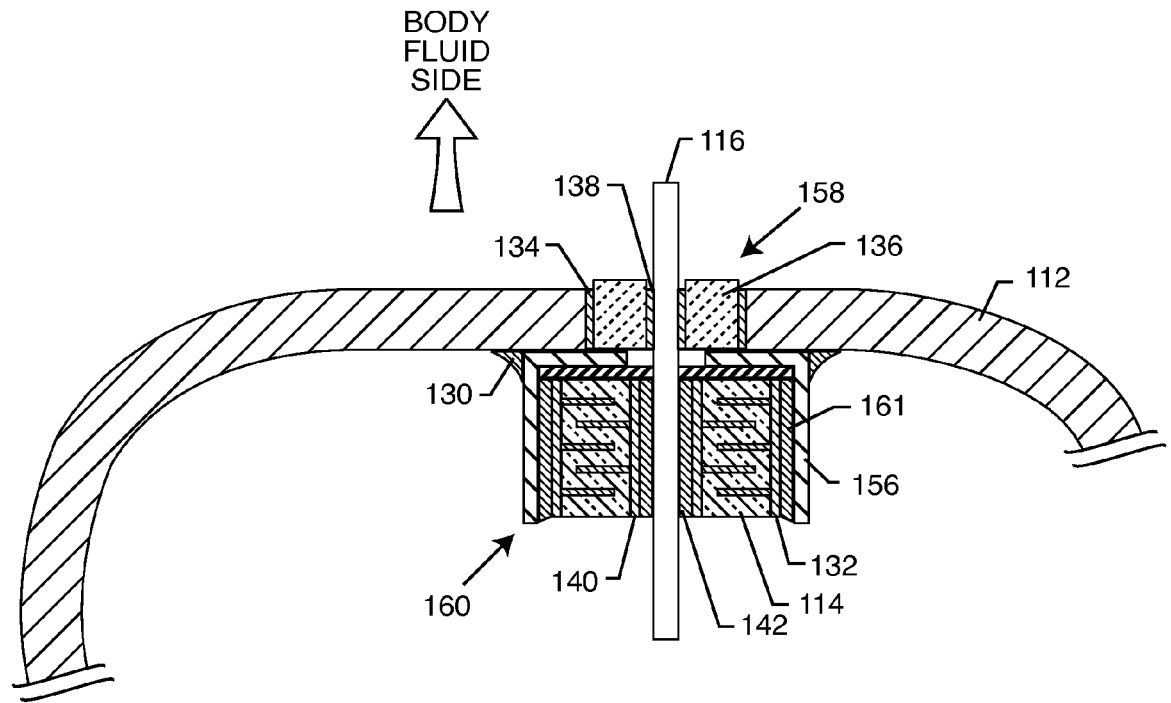
FIG. 29 is a fragmented sectional view of a portion of an AIMD housing with a modular EMI terminal assembly embodying the present invention, wherein the modular cup is conductively coupled directly to the AIMD housing without the use of a ferrule.

FIG. 29 shows a feedthrough capacitor subassembly 160 in accordance with the present invention. In this case, a hermetic seal 158 is formed directly between the housing 112 of an AIMD and a terminal pin 116. Gold brazes 134 and 138 form a mechanical and hermetic attachment from the insulator 136 and the AIMD housing 112 and also from the insulator 136 and the leadwire 116. In this case, there is no actual ferrule 122 that has been illustrated in previous drawings. The cup 156 is electrically attached at 130 directly to the housing 112 of the AIMD. As previously discussed, it is very important that a low impedance oxide free connection be formed between the cup 156 and the equipotential ground plate which in this case is the housing 112 of the AIMD. For example, if the housing 112 is of titanium, it would be necessary to apply some sort of non-oxidizing surface to the area of the housing 112 to which the cup 156 attaches. This, for example, could be gold sputtering, a gold braze or the like. Another method of surface preparation of the housing 112 could include localized cleaning such as by abrasives, microblasting or the like. This would remove surface oxides which would allow a low impedance electrical connection 130 to be formed. The reason this is non-ideal is that oxides can reoccur over time and degrade the electrical connection.

Figure 30:
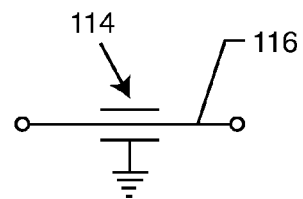
FIG. 30 is an electrical schematic diagram of the unipolar feedthrough capacitor shown in FIG. 29.

FIG. 30 is a schematic drawing of the unipolar capacitor 114 of FIG. 32. It will be appreciated that any number of terminal pins 116 could penetrate through the AIMD housing 112 and be connected without a ferrule 122 as illustrated in FIG. 29.

Figure 31:
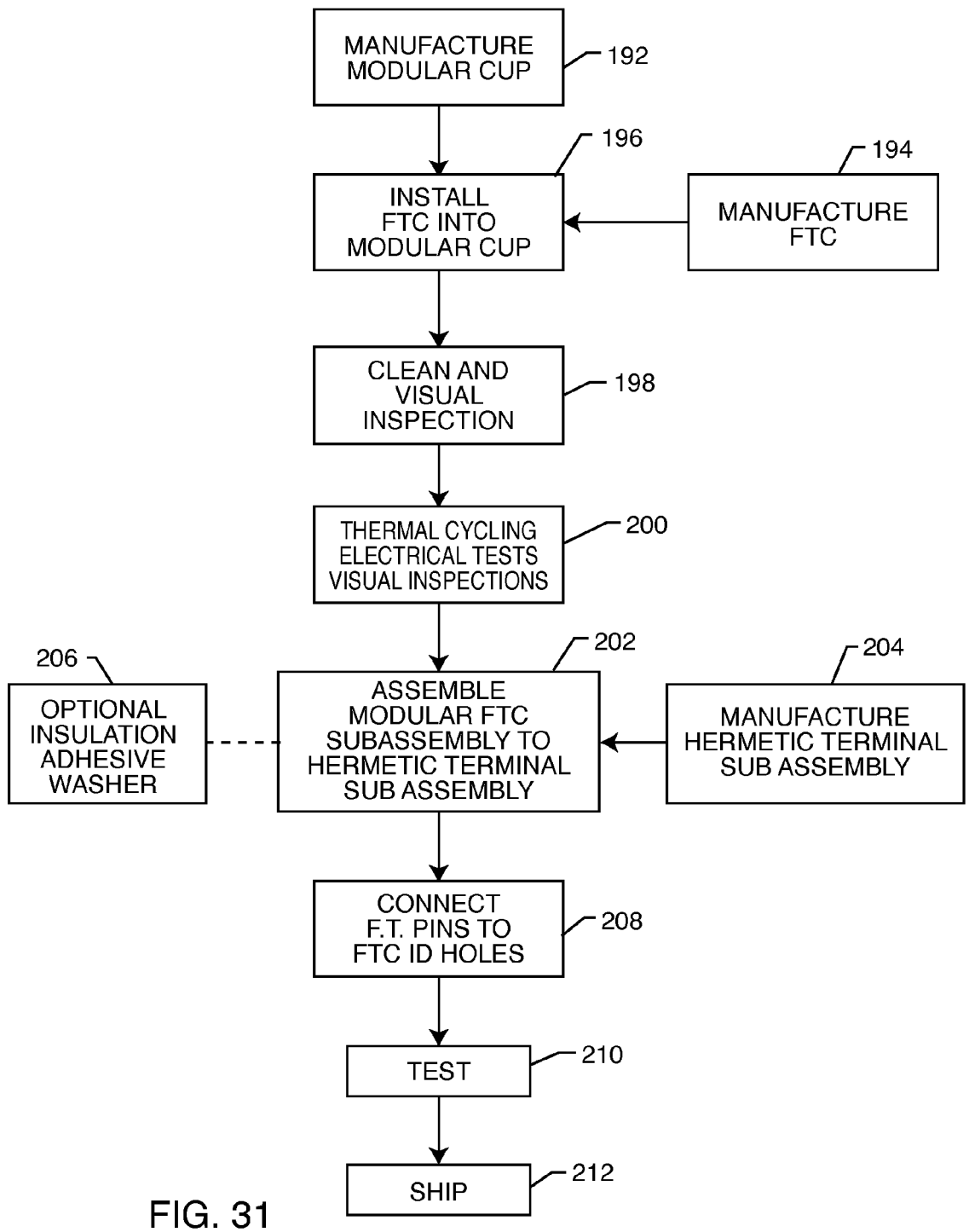
FIG. 31 is a manufacturing block diagram illustrating the steps of building the EMI filtered terminal assembly of the present invention.

FIG. 31 is a manufacturing block diagram illustrating the steps of building a modular feedthrough capacitor subassembly 160 and attaching it to a hermetic terminal subassembly 158 in accordance with the present invention. First, the modular cup 156 is formed by metal stamping metal injection molding or machining (192). In general, it would then be electroplated so that it had a solderable low resistivity surface. The feedthrough capacitor 114 would also be manufactured in a separate manufacturing operation (194). The feedthrough capacitor would then be installed (196) into the modular cup 156. This involves making, in general, an outside diameter connection between the capacitor metallization 132 and the inside diameter of the cup 156. If the cup 156 is internally grounded, then a connection is made between an internal ground pin 166 and one or more ground feedthrough passages of the feedthrough capacitor. At this point, the feedthrough capacitor subassembly 160 is cleaned (for example, in a vapor degreaser) and then an optional visual inspection is performed (198). The purpose of the visual inspection is to make sure that the feedthrough capacitor has proper electrical connections and that it is free of defects such as cracks. The feedthrough capacitor subassembly 160 can then be tested (200). Electrical tests can include insulation resistance (IR), dielectric withstanding voltage (DWV), thermal shock followed by voltage conditioning. Voltage conditioning is typically performed by applying a factor times the capacitor's rated voltage and testing it at elevated temperatures such as 125 degrees C.

The feedthrough capacitor subassembly 160 is now ready for mounting and assembly (202) to the hermetic terminal subassembly 158. As shown, the hermetic terminal subassembly 158 is manufactured in a separate operation (204). One or more optional insulating adhesive washer(s) 128 can be disposed between the feedthrough capacitor 114 and the top surface of the hermetic terminal subassembly 158. As described previously, this optional insulating washer 128 could have been added just prior to installing the feedthrough capacitor 114 into the modular cup 156. In other words, it can be disposed between the capacitor 114 and the cup 156 or between the cup 156 and the top surface of the insulator 136, or both. A mechanical and electrical connection (208) is made between the cup 156 and the ferrule 122 of the hermetic terminal subassembly 158 (or the housing 112 of the AIMD). In addition, an electrical connection is made between the feedthrough pins 116 and the feedthrough capacitor 114 inside diameter holes. These electrical connections can be accomplished by thermal-setting conductive adhesives, solders, brazes or the like. Then the entire assembly can be visually inspected and tested (210) prior to inventory and shipment (212).

From the foregoing it will be appreciated that the present invention relates to a modular EMI filtered terminal assembly 154 for an active implantable medical device. The modular EMI filtered hermetic terminal assembly 154 comprises a hermetic terminal subassembly 158 and a feedthrough capacitor subassembly 160 disposed generally adjacent to the hermetic terminal subassembly. The hermetic terminal subassembly 158 includes at least one conductor or leadwire 116 which extends through an insulator 136 in non-conductive relation with the AIMD housing 112. The feedthrough capacitor subassembly 160 includes a conductive modular cup 156 which is conductively coupled to the AIMD housing 112, and a feedthrough capacitor 114 disposed within the modular cup. A first electrode plate or set of electrode plates 126 are conductively coupled to the at least one conductor or leadwire 116, and a second electrode plate or set of electrode plates 12 are conductively coupled to the modular cup 156.

In a related process for manufacturing the EMI filtered terminal assembly, the feedthrough capacitor 114 is installed at least partially into the modular cup 156 such that the ground electrode plate or set of electrode plates 124 is conductively coupled to the modular cup. The formed feedthrough capacitor subassembly 160 is assembled to a hermetic terminal subassembly 158 such that the at least one conductor or leadwire 116 is conductively coupled to the active electrode plate or set of electrode plates 126.

Although several embodiments of the invention have been described in detail for purposes of illustration, various modifications may be made without departing from the spirit and scope of the invention. Accordingly, the invention is not to be limited, except as by the appended claims.

The invention claimed is:

1. A modular EMI filtered terminal assembly, comprising:
   a) a hermetic terminal subassembly comprising:
      i) a ferrule comprising a ferrule sidewall extending from a first ferrule end to a second ferrule end;
      ii) an insulator comprising an insulator body having a first insulator surface spaced from a second insulator surface by an outer insulator sidewall with at least one insulator via extending through the insulator body from the first insulator surface to the second insulator surface thereof, wherein the insulator is hermetically sealed to the ferrule with the first insulator end adjacent to the first ferrule end and the second insulator end adjacent to the second ferrule end; and
      iii) at least one conductor extending through the at least one insulator via in a hermetic relationship therewith; and
   b) a feedthrough capacitor subassembly comprising:
      i) a conductive modular cup comprising a cup sidewall extending from a webplate to an opposite open cup end;
      ii) a feedthrough capacitor comprising a dielectric body having a first dielectric surface spaced from a second dielectric surface by an outer dielectric sidewall with at least one dielectric via extending through the dielectric body from the first dielectric surface to the second dielectric surface thereof;
      iii) at least one first electrode plate supported by the dielectric body in spaced relation with at least one second electrode plate, the at least one first electrode plate being electrically connected to the at least one conductor by a first conductive material contacting a first metallization at the at least one dielectric via, the first electrode plate being spaced from a second metallization at the outer dielectric sidewall, and the second electrode plate being electrically connected to the cup sidewall by a second conductive material contacting the second metallization at the outer dielectric sidewall, the first electrode plate being spaced from the first metallization at the dielectric via and the at least one conductor; and
      iv) wherein the feedthrough capacitor is at least partially disposed within the modular cup with the first dielectric surface adjacent to the webplate and the second dielectric surface adjacent to the open cup end; and c) an electrical connection from the modular cup of the feedthrough capacitor subassembly to the ferrule of the hermetic terminal subassembly, wherein the second dielectric surface adjacent to the modular cup open end is a greater distance spaced from the first insulator end and from the first ferrule end than that of the first dielectric surface and the cup webplate spaced from the first insulator and ferrule ends.

2. The modular EMI filtered terminal assembly of claim 1, wherein the ferrule is configured to be conductively coupled to an AIMD housing.

3. The modular EMI filtered terminal assembly of claim 1 wherein the modular cup sidewall includes at least one aperture for facilitating conductive attachment between the second metallization at the outer dielectric sidewall and the modular cup.

4. The modular EMI filtered terminal assembly of claim 1 wherein the webplate extends from the cup sidewall part way to the dielectric via in the dielectric body of the feedthrough capacitor.

5. The modular EMI filtered terminal assembly of claim 1 wherein the webplate extends from the cup sidewall to the dielectric via in the dielectric body of the feedthrough capacitor.

6. The modular EMI filtered terminal assembly of claim 1 wherein facing surfaces of the webplate and the hermetic terminal subassembly define a leak detection gap.

7. The modular EMI filtered terminal assembly of claim 1 wherein the modular cup sidewall at least partially surrounds the outer dielectric sidewall of the feedthrough capacitor, and a web flange is at least partially disposed about a periphery of the modular cup sidewall.

8. The modular EMI filtered terminal assembly of claim 1, including an electrically insulative washer disposed between the feedthrough capacitor subassembly and the hermetic terminal subassembly.

9. The modular EMI filtered terminal assembly of claim 8, wherein the insulative washer is disposed between the hermetic terminal subassembly and the modular cup.

10. The modular EMI filtered terminal assembly of claim 8 or 9, wherein the insulative washer is disposed between the feedthrough capacitor and the modular cup.

11. The modular EMI filtered terminal assembly of claim 1 or 2, wherein the feedthrough capacitor is internally grounded to the modular cup.

12. The modular EMI filtered terminal assembly of claim 1 wherein the modular cup includes a conductive ground pin extending into the feedthrough capacitor and conductively coupled to the at least one second electrode plate.

13. The modular EMI filtered terminal assembly of claim 1 including a peripheral gap between the outer dielectric sidewall of the feedthrough capacitor and the modular cup.

14. The modular EMI filtered terminal assembly of claim 1 wherein the modular cup includes mounting tabs for conductive attachment to the ferrule.

15. The modular EMI filtered terminal assembly of claim 14, including pins received in openings in the mounting tabs for attaching the modular cup to the ferrule.

16. The modular EMI filtered terminal assembly of claim 1 wherein the modular cup includes, a ferrule mounting flange.

17. The modular EMI filtered terminal assembly of claim 16, wherein the ferrule mounting flange of the modular cup includes at least one aperture for facilitating conductive material attachment between the modular cup and the ferrule.

18. The modular EMI filtered terminal assembly of claim 16 wherein the ferrule mounting flange of the modular cup is connected to the ferrule by at least one of the group consisting of a thermal setting conductive adhesive, a solder, a braze, a weld, and combinations thereof.

19. A process for manufacturing an EMI filtered terminal assembly for an active implantable medical device (AIMD), comprising the steps of:
 a) providing a hermetic terminal subassembly comprising:
  i) a ferrule comprising a ferrule sidewall extending from a first ferrule end to a second ferrule end;
  ii) an insulator comprising an insulator body having a first insulator surface spaced from a second insulator surface by an outer insulator sidewall with at least one insulator via extending through the insulator body from the first insulator surface to the second insulator surface thereof, wherein the insulator is hermetically sealed to the ferrule with the first insulator end adjacent to the first ferrule end and the second insulator end adjacent to the second ferrule end; and
  iii) at least one conductor extending through the at least one insulator via in a hermetic relationship therewith;
 b) providing a feedthrough capacitor subassembly comprising:
  i) a conductive modular cup comprising a cup sidewall extending from a webplate to an opposite open cup end;
  ii) a feedthrough capacitor comprising a dielectric body having a first dielectric surface spaced from a second dielectric surface by an outer dielectric sidewall with at least one dielectric via extending from the first dielectric surface to the second dielectric surface thereof;
  iii) at least one active electrode plate supported by the dielectric body in spaced relation with at least one ground electrode plate, the at least one active electrode plate being electrically connected to the at least one conductor by a first conductive material contacting a first metallization at the at least one dielectric via, the active electrode plate being spaced from a second metallization at the outer dielectric sidewall, and the ground electrode plate being electrically connected to the cup sidewall by a second conductive material contacting the second metallization at the outer dielectric sidewall, the active electrode plate being spaced from the first metallization at the dielectric via and the at least one conductor; and
  iv) wherein the feedthrough capacitor is at least partially disposed within the modular cup with the first dielectric surface adjacent to the webplate and the second dielectric surface adjacent to the open cup end; and
 c) assembling the feedthrough capacitor subassembly to the hermetic terminal, subassembly with the at least one conductor extending through the dielectric via; and
 d) electrically connecting the at least one conductor to the at least one active electrode plate by a second metallization at the dielectric via, wherein the second dielectric surface adjacent to the modular cup open end is a greater distance spaced from the first insulator end and from the first ferrule end than that of the first dielectric surface and the cup webplate spaced from the first insulator and ferrule ends.

20. The process of claim 19 including the step of subjecting the feedthrough capacitor subassembly to thermal cycles or shocks prior to its assembly to the hermetic terminal subassembly.

21. The process of claim 20, including the step of testing the mechanical characteristics of the feedthrough capacitor subassembly prior to its assembly to the hermetic terminal, subassembly.

22. The process of claim 20, including the step of testing the electrical characteristics of the feedthrough capacitor subassembly prior to its assembly to the hermetic terminal subassembly.

23. The process of claim 19 wherein the modular cup sidewall includes at least one aperture for facilitating conductive attachment between the first metallization at the outer dielectric sidewall and the modular cup.

24. The process of claim 19 wherein the webplate extends from the cup sidewall at least part way to the dielectric via in the dielectric body of the feedthrough capacitor.

25. The process of claim 19 including the step of providing a leak detection gap between facing surfaces of the webplate and the hermetic terminal subassembly.

26. The process of claim 19, including the step of providing an electrically insulative washer between the feedthrough capacitor and the hermetic terminal subassembly, wherein the insulative washer is disposed between the hermetic terminal subassembly and the modular cup, or between the feedthrough capacitor and the modular cup, or both.

27. The process of claim 19, including the step of internally grounding the feedthrough capacitor to the modular cup.

28. The process of claim 27, wherein the modular cup includes a conductive ground pin extending into the feedthrough capacitor and conductively coupled to the at least one ground electrode plate.

29. The process of claim 27, including the step of providing a peripheral gap between the outer dielectric sidewall of the feedthrough capacitor and the modular cup.

30. The process of claim 19 wherein the modular cup includes mounting tabs for conductive attachment to the ferrule, and including the step of attaching the modular cup to the ferrule utilizing conductive pins received in openings in the mounting tabs.

31. The process of claim 19 wherein the modular cup includes mounting tabs for conductive attachment to the ferrule and a ferrule mounting flange having at least one mounting tab aperture therethrough, and the process including the step of utilizing the mounting tab aperture for adhesively attaching the modular cup to the ferrule.

32. The process of claim 19 wherein the modular cup comprises a web flange at least partially disposed about a periphery of the modular cup sidewall.

33. The process of claim 19, including the steps of utilizing a high-temperature solder when installing the feedthrough capacitor into the modular cup, and subsequently assembling the feedthrough capacitor subassembly to the hermetic terminal subassembly utilizing a relatively lower temperature assembly procedure.

34. A feedthrough capacitor, comprising:
a) a modular cup comprising a cup sidewall extending from a webplate to an opposite open cup end, wherein there is at least one aperture in the modular cup sidewall;
b) a feedthrough capacitor comprising a dielectric body having a first dielectric surface spaced from a second dielectric surface by an outer dielectric sidewall with at least one dielectric via extending through the dielectric body from the first dielectric surface to the second dielectric surface thereof, and
c) at least one first electrode plate supported by the dielectric body in spaced relation with at least one second electrode plate, the at least one first electrode plate being electrically connected to the at least one conductor by a first conductive material contacting a first metallization at the at least one dielectric via, the first electrode plate being spaced from a second metallization at the outer dielectric sidewall, and
d) the at least one second electrode plate being electrically connected to the cup sidewall by a second conductive material at the at least one aperture in the modular cup sidewall and contacting the second metallization at the outer dielectric sidewall, the first electrode plate being spaced from the first metallization at the dielectric via and the conductor.

35. The feedthrough capacitor of claim 34 wherein the at least one aperture in the modular cup sidewall facilitates conductive attachment between the second metallization at the outer dielectric sidewall and the modular cup.

36. The feedthrough capacitor of claim 34 wherein the modular cup is of copper.

37. A modular EMI filtered terminal assembly, comprising:
a) a hermetic terminal subassembly comprising:
i) a ferrule comprising a ferrule sidewall extending from a first ferrule end to a second ferrule end;
ii) an insulator comprising an insulator body having a first insulator surface spaced from a second insulator surface by an outer insulator sidewall with at least one insulator is extending through the insulator body from the first insulator surface to the second insulator surface thereof, wherein the insulator is hermetically sealed to the ferrule with the first insulator end adjacent to the first ferrule end and the second insulator end adjacent to the second ferrule end; and
iii) at least one conductor extending through the at least one insulator via in a hermetic relationship therewith; and
b) a feedthrough capacitor subassembly comprising:
i) a conductive modular cup comprising a cup sidewall extending from a webplate to an opposite open cup end;
ii) a feedthrough capacitor comprising a dielectric body having a first dielectric surface spaced from a second dielectric surface by an outer dielectric sidewall with at least a first and a second dielectric vias extending through the dielectric body from the first dielectric surface to the second dielectric surface thereof;
iii) at least one active electrode plate supported by the dielectric body in spaced relation with at least one ground electrode plate, the at least one active electrode plate being electrically connected to the at least one conductor by a first conductive material contacting a first metallization at the at least one first dielectric via, but spaced from a second metallization at the second dielectric via, and the ground electrode plate being electrically connected to a ground pin connected to the webplate and extending through the second dielectric via by a second metallization, but spaced from the first metallization at the first dielectric via such that the at least one active electrode plate is conductively coupled to the at least one conductor, and the at least one ground electrode plate is conductively coupled to the modular cup by the ground pin,
iv) wherein the feedthrough capacitor is at least partially disposed within the modular cup with the first dielectric surface adjacent to the webplate and the second dielectric surface adjacent to the open cup end; and
c) an electrical connection from the modular cup of the feedthrough capacitor subassembly to the ferrule of the hermetic terminal subassembly, wherein the second dielectric surface adjacent to the modular cup open end is a greater distance spaced from the first insulator end and from the first ferrule end than that of the first dielectric surface and the cup webplate spaced from the first insulator an ferrule ends.

38. The modular EMI filtered terminal assembly of claim 37 including a conductive adhesive electrically connecting the modular cup of the feedthrough capacitor subassembly to the ferrule of the hermetic terminal subassembly.

39. The modular EMI filtered terminal assembly of claim 37 wherein the modular cup includes mounting tabs with openings and including pins received in the openings in the mounting tabs for attaching the modular cup to the ferrule.

40. The modular EMI filtered terminal assembly of claim 37 wherein facing surfaces of the webplate and the hermetic terminal subassembly define a leak detection gap.

41. The modular EMI filtered terminal assembly of claim 37 including an electrically insulative washer disposed between the feedthrough capacitor subassembly and the hermetic terminal subassembly.

42. The modular EMI filtered terminal assembly of claim 41 wherein the insulative washer is disposed between the hermetic terminal subassembly and the modular cup.

43. The modular EMI filtered terminal assembly of claim 41 wherein the insulative washer is disposed between the feedthrough capacitor and the modular cup.

44. An active implantable medical device (AIMD), comprising:
   a) a hermetic terminal subassembly comprising:
      i) an insulator comprising an insulator body having a first insulator surface spaced from a second insulator surface by an outer insulator sidewall with at least one insulator via extending through the insulator body from the first insulator surface to the second insulator surface thereof, wherein the insulator is hermetically sealed in an opening in a housing for the AIMD; and
      ii) at least one conductor extending through the at least one insulator via in a hermetic relationship therewith; and
   b) a feedthrough capacitor subassembly comprising:
      i) a conductive modular cup comprising a cup sidewall extending from a webplate to an opposite open cup end;
      ii) a feedthrough capacitor comprising a dielectric body having a first dielectric surface spaced from a second dielectric surface by an outer dielectric sidewall, with at least one dielectric via extending through the dielectric body from the first dielectric surface to the second dielectric surface thereof;
      iii) at least one first electrode plate supported by the dielectric body in spaced relation with at least one second electrode plate, the at least one first electrode plate being electrically connected to the at least one conductor by a first conductive material contacting a first metallization at the at least one dielectric via, the first electrode plate being spaced from a second metallization at the outer dielectric sidewall, and the second electrode plate being electrically connected to the cup sidewall by a second conductive material contacting the second metallization at the outer dielectric sidewall, the first electrode plate being spaced from the first metallization at the dielectric via and the at least one conductor; and
      iv) wherein the feedthrough capacitor is at least partially disposed within the modular cup with the first dielectric surface adjacent to the webplate and the second dielectric surface adjacent to the open cup end; and
   c) an electrical connection from the modular cup of the feedthrough capacitor subassembly to the housing for the AIMD, wherein the second dielectric surface adjacent to the modular cup open end is a greater distance spaced from the first insulator end than that of the first dielectric surface and the cup webplate spaced from the first insulator end.

45. The active implantable medical device of claim 44 wherein the modular cup sidewall includes at least one aperture for facilitating conductive attachment between the second metallization at the outer dielectric sidewall and the modular cup.

46. The active implantable medical device of claim 44 wherein the webplate extends from the cup sidewall either to or part way to the dielectric via in the dielectric body of the feedthrough capacitor.

47. The active implantable medical device of claim 44 wherein facing surfaces of the webplate and the hermetic terminal subassembly define a leak detection gap.

48. The active implantable medical device of claim 44 including an electrically insulative washer disposed between the feedthrough capacitor subassembly and the hermetic terminal subassembly.

49. The active implantable medical device of claim 48 wherein the insulative washer is disposed between the hermetic terminal subassembly and the modular cup.

50. The active implantable medical device of claim 48 or 49 wherein the insulative washer is disposed between the feedthrough capacitor and the modular cup.

51. The active implantable medical device of claim 44 wherein, the feedthrough capacitor is internally grounded to the modular cup.

52. The active implantable medical device of claim 44 wherein the modular cup includes a conductive ground pin extending into the feedthrough capacitor and conductively coupled to the at least one second electrode plate.

53. The active implantable medical device of claim 44 including a peripheral gap between the outer dielectric sidewall of the feedthrough capacitor and the modular cup.

* * * * *

UNITED STATES PATENT AND TRADEMARK OFFICE
CERTIFICATE OF CORRECTION

| | | |
|---|---|---|
| PATENT NO. | : 8,659,870 B2 | Page 1 of 1 |
| APPLICATION NO. | : 12/951559 | |
| DATED | : February 25, 2014 | |
| INVENTOR(S) | : Brendel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 316 days.

Signed and Sealed this
Sixteenth Day of June, 2015

Michelle K. Lee
*Director of the United States Patent and Trademark Office*

UNITED STATES PATENT AND TRADEMARK OFFICE
CERTIFICATE OF CORRECTION

PATENT NO. : 8,659,870 B2  Page 1 of 1
APPLICATION NO. : 12/951559
DATED : February 25, 2014
INVENTOR(S) : Robert L. Brendel et al.

It is certified that error appears in the above-identified patent and that said Letters Patent is hereby corrected as shown below:

In The Claims

Column 16, line 54 (Claim 19, line 48) after the word "terminal" delete the ","

Column 17, line 3 (Claim 21, line 3) after the word "terminal" delete the ","

Column 18, line 25 (Claim 37, line 8) after the word "insulator" insert --via-- in place of "is"

Column 19, line 45 (Claim 44, line 20) after the word "sidewall" delete the ","

Column 20, line 44 (Claim 51, line 2) after the word "wherein" delete the ","

Signed and Sealed this
Seventeenth Day of November, 2015

Michelle K. Lee
*Director of the United States Patent and Trademark Office*